(12) United States Patent
Kolessar et al.

(10) Patent No.: US 7,483,975 B2
(45) Date of Patent: Jan. 27, 2009

(54) SYSTEMS AND METHODS FOR GATHERING DATA CONCERNING USAGE OF MEDIA DATA

(75) Inventors: Ronald S. Kolessar, Elkridge, MD (US); James M. Jensen, Columbia, MD (US); Jack K. Zhang, Ijamsville, MD (US); Courtney Lewis Wood, Baltimore, MD (US); Eugene L. Flanagan, III, Wilton, CT (US)

(73) Assignee: Arbitron, Inc.

( * ) Notice: Subject to any disclaimer, the term of this patent is extended or adjusted under 35 U.S.C. 154(b) by 1049 days.

(21) Appl. No.: 10/811,174

(22) Filed: Mar. 26, 2004

(65) Prior Publication Data

US 2005/0216509 A1  Sep. 29, 2005

(51) Int. Cl.
*G06F 15/173* (2006.01)
(52) U.S. Cl. .............. 709/224; 709/205; 709/213; 709/218; 709/223; 709/225; 725/9; 725/10; 725/32; 725/34
(58) Field of Classification Search ........... 709/223, 709/224, 205, 213, 218, 225; 725/9, 10, 725/32, 34
See application file for complete search history.

(56) References Cited

U.S. PATENT DOCUMENTS

| | | | |
|---|---|---|---|
| 3,919,479 A | 11/1975 | Moon et al. |
| 4,230,990 A | 10/1980 | Lert, Jr. et al. |
| 4,450,551 A | 5/1984 | Kudo et al. |
| 4,644,509 A | 2/1987 | Kiewit et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,843,562 A | 6/1989 | Kenyon et al. |
| 4,876,736 A | 10/1989 | Kiewit |
| 4,918,730 A | 4/1990 | Schulze |
| 4,930,011 A | 5/1990 | Kiewit |
| 4,955,070 A | 9/1990 | Welsch et al. |
| 5,319,735 A | 6/1994 | Preuss et al. |
| 5,450,490 A | 9/1995 | Jensen et al. |
| 5,481,294 A | 1/1996 | Thomas et al. |
| 5,512,933 A | 4/1996 | Wheatley et al. |
| 5,574,962 A | 11/1996 | Fardeau et al. |
| 5,579,124 A | 11/1996 | Aijala et al. |
| 5,581,800 A | 12/1996 | Fardeau et al. |
| 5,612,729 A | 3/1997 | Ellis et al. |
| 5,764,763 A | 6/1998 | Jensen et al. |
| 5,787,334 A | 7/1998 | Fardeau et al. |

(Continued)

FOREIGN PATENT DOCUMENTS

WO    WO 91/11062 A1    7/1991

(Continued)

*Primary Examiner*—Liangche A Wang
(74) *Attorney, Agent, or Firm*—Katten Muchin Rosenman

(57) ABSTRACT

The present invention concerns methods and systems for gathering data concerning usage of media data provided from a predetermined receiver to a user. First data concerning usage of the media data is gathered by means of a portable monitor carried on the person of the user. Second data concerning usage of media data by the predetermined receiver is gathered by a monitoring system separate from the portable monitor, the second data corresponding to at least a portion of the first data. Audience measurement data is produced based on the first and second data.

111 Claims, 15 Drawing Sheets

U.S. PATENT DOCUMENTS

| | | | |
|---|---|---|---|
| 5,828,325 | A | 10/1998 | Wolosewicz et al. |
| 5,945,932 | A | 8/1999 | Smith et al. |
| 6,154,484 | A | 11/2000 | Lee et al. |
| 6,175,627 | B1 | 1/2001 | Petrovic et al. |
| 6,845,360 | B2 | 1/2005 | Jensen et al. |
| 6,862,355 | B2 | 3/2005 | Kolessar et al. |
| 6,871,180 | B1 | 3/2005 | Neuhauser et al. |
| 6,958,710 | B2 * | 10/2005 | Zhang et al. ................ 340/999 |
| 7,174,151 | B2 * | 2/2007 | Lynch et al. ............ 455/404.1 |
| 2002/0054750 | A1 * | 5/2002 | Ficco et al. .................... 386/46 |
| 2002/0178447 | A1 * | 11/2002 | Plotnick et al. ............... 725/36 |
| 2003/0005430 | A1 | 1/2003 | Kolessar |
| 2003/0149975 | A1 * | 8/2003 | Eldering et al. ............... 725/34 |
| 2004/0101271 | A1 * | 5/2004 | Boston et al. ................. 386/46 |
| 2004/0101272 | A1 * | 5/2004 | Boston et al. ................. 386/46 |

FOREIGN PATENT DOCUMENTS

| | | |
|---|---|---|
| WO | WO 96/27264 A1 | 9/1996 |
| WO | WO 98/26529 A2 | 6/1998 |
| WO | WO 99/59275 A1 | 11/1999 |
| WO | WO 00/04662 A1 | 1/2000 |

* cited by examiner

| Actual time on 7/8/03 (24-hour clock) | Stationary monitoring device | | Portable monitor | | | | Audience measurement data from processor | |
|---|---|---|---|---|---|---|---|---|
| | Channel ID | Time code | User ID | Channel ID | Time of detection data | Detection Error Rate | Channel ID | Other data |
| 11:00:00 | ABC | 070803.110000 | 1234567 | ABC | 070803.110000 | 1 | ABC | Real time; No mute |
| 11:00:20 | ABC | 070803.110020 | | | | 1 | ABC | No mute |
| 11:00:40 | ABC | 070803.110040 | | | | 1 | ABC | No mute |
| 11:01:00 | ABC | 070803.110100 | 1234567 | ABC | 070803.110100 | 1 | ABC | Real time; No mute |
| 11:01:20 | CBS | 070803.110120 | | | | 2 | CBS | No mute |
| 11:01:40 | CBS | 070803.110140 | | | | 1 | CBS | No mute |
| 11:02:00 | CBS | 070803.110200 | 1234567 | CBS | 070803.110200 | 1 | CBS | Real time; No mute |
| 11:02:20 | CBS | 070803.110220 | | | | 1 | CBS | No mute |
| 11:02:40 | CBS | 070803.110240 | | | | 1 | CBS | No mute |
| 11:03:00 | CBS | 070803.110300 | 1234567 | | 070803.110300 | 999 | CBS | Real time; Muted |
| 11:03:20 | CBS | 070803.110320 | | | | 999 | CBS | Muted |
| 11:03:40 | FOX | 070603.200000 | | | | 1 | FOX | No mute |
| 11:04:00 | FOX | 070603.200020 | 1234567 | FOX | 070803.110400 | 1 | FOX | Recorded; No mute |
| 11:04:20 | FOX | 070603.200040 | | | | 2 | FOX | No mute |
| 11:04:40 | FOX | 070603.200100 | | | | 1 | FOX | No mute |
| 11:05:00 | FOX | 070603.200120 | 1234567 | FOX | 070803.110500 | 1 | FOX | Recorded; No mute |
| 11:05:20 | FOX | 070603.200140 | | | | 1 | FOX | No mute |
| 11:05:40 | FOX | 070603.200200 | | | | 1 | FOX | User left vicinity of receiver. |
| 11:05:42 | FOX | 070603.200202 | | | | 2 | FOX | |
| 11:05:44 | FOX | 070603.200204 | | | | 3 | FOX | |
| 11:05:46 | FOX | 070603.200206 | | | | 2 | FOX | |
| 11:05:48 | FOX | 070603.200208 | | | | 3 | FOX | |
| 11:05:50 | FOX | 070603.200210 | | | | 4 | FOX | |
| 11:05:52 | FOX | 070603.200212 | | | | 4 | FOX | |

Time Code / Time of Detection Data:   MMDDYY.HHMMSS (M=Month, D=Day, Y=Year; H=Hour (24-hour clock), M=Minute, S=Second)

Figure 10

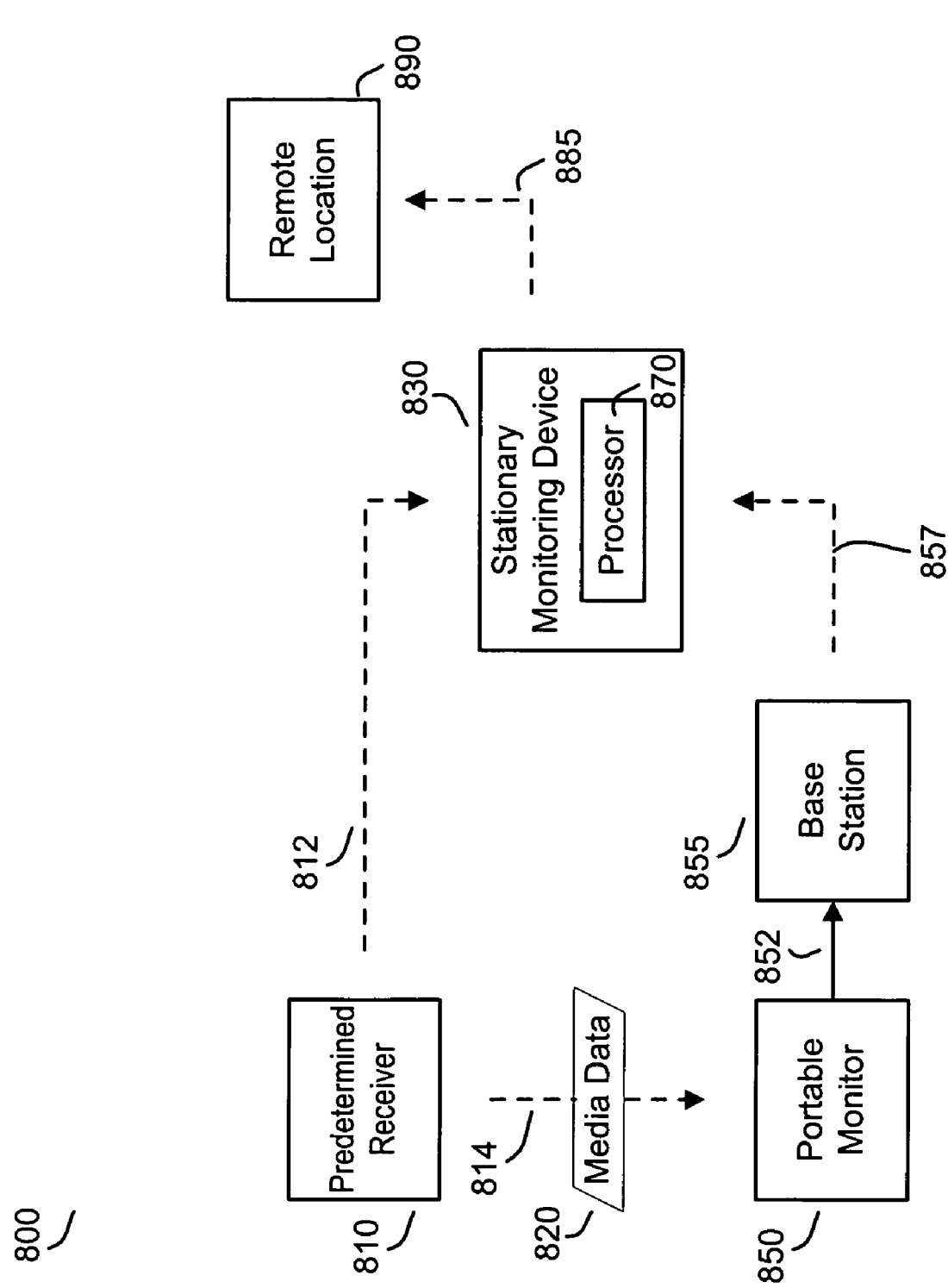

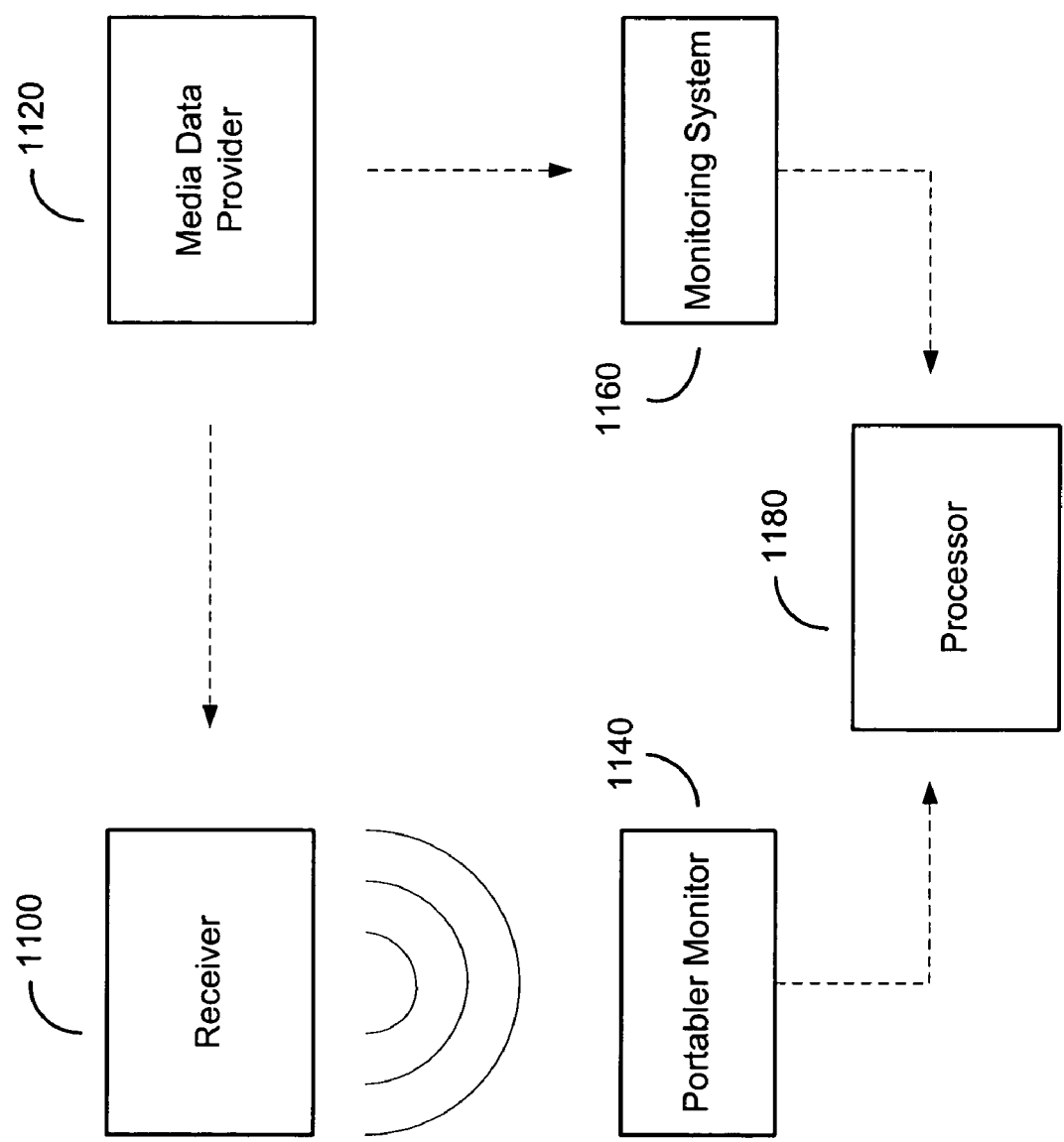

SYSTEMS AND METHODS FOR GATHERING DATA CONCERNING USAGE OF MEDIA DATA

BACKGROUND OF THE INVENTION

The present invention relates to systems and methods for gathering data concerning usage of media data received by a predetermined receiver and reproduced thereby for a user.

There is considerable interest in gathering data concerning the usage of media data by an audience in order to provide market information to advertisers, media distributors, and the like, whether to verify airing, broadcast, or distribution, to calculate royalties, to detect piracy, or to gather data for any other purposes for which an estimation or detection of media data usage is desired. There is also considerable interest in providing market information revealing demographic characteristics of such audiences, along with information concerning the size of the audience. In addition, there is substantial interest in the ability to monitor media audiences on a continuous, real-time basis. This becomes very important for measuring usage of media data accurately, because an insufficiently frequent measurement fails to capture the ongoing and continuous nature of streaming media data usage, as well as the usage of more traditional media data such as television and radio.

Certain proposed techniques for gathering data concerning usage of media data include detecting ancillary codes encoded in the media data. One advantageous technique of adding an ancillary code to the audio portion of media data and detecting the same is the CBET technology developed by Arbitron Inc., the assignee of the present application. This technology is already providing useful audience estimates to numerous media distributors and advertisers. Other proposed techniques add ancillary codes to the video portion of media data, or to data packets in a digital broadcast stream.

Alternative proposed techniques utilize "signature" extraction and pattern matching. These techniques typically involve the use of a reference signature database, containing a reference signature for each program in the media data for which exposure is to be measured. The reference signatures are created by measuring or extracting certain features of the respective programs before broadcast. Upon reception of the media data, signature extraction is again performed, and the extracted signatures are compared to the reference signatures to find matches. One disadvantage of such pattern matching techniques is the substantial amount of data processing required to create the reference signature database, extract signatures from received media data, and carry out pattern matching to obtain the audience measurement data. In order to keep the data processing requirements at an acceptable level, yet still obtain measurement data at acceptably short time intervals, the techniques exploiting ancillary codes are often preferable.

The proposed techniques employ either a stationary monitor or a portable monitor to perform ancillary code detection. A stationary monitor typically monitors exposure at one location, such as near a predetermined receiver in a household, while a portable monitor typically measures exposure of a predetermined audience member at various locations. One advantage of the stationary monitor is its ability to obtain channel or program reception data resolved at relatively short time intervals; however, a stationary monitor used exclusively does not provide for a convenient way to monitor the media data use of a specific audience member at multiple locations. Further, the stationary monitor relying on ancillary codes is unable to determine when an audience member leaves the room. One advantage of the portable monitor is that it can gather data concerning an individual audience member, including recognizing the presence of the audience member; however, the exclusive use of a portable monitor, which typically employs sound detection to determine exposure of the audience member to media data, provides a limited ability to resolve channel or program reception, since sound detection provides a relatively noisy signal. This limits the portable monitor's ability to measure length of exposure, exposure to short segments, such as commercials, and frequent changes in the media data received, such as channel changes and the like.

What is needed is a technique that takes advantage of the benefits offered by both the stationary monitor and the portable monitor to accurately measure the media data exposure of individual users resolved at desirably short intervals, while overcoming the aforementioned disadvantages inherent in each method used independently.

SUMMARY OF THE INVENTION

For this application the following terms and definitions shall apply, both for the singular and plural forms of nouns and for all verb tenses:

The term "data" as used herein means any indicia, signals, marks, domains, symbols, symbol sets, representations, and any other physical form or forms representing information, whether permanent or temporary, whether digital or analog, whether visible, audible, acoustic, electric, magnetic, electromagnetic, or otherwise manifested. The term "data" as used to represent particular information in one physical form shall be deemed to encompass any and all representations of the same particular information in a different physical form or forms.

The term "audio data" as used herein means any data representing acoustic energy, including, but not limited to, audible sounds, regardless of the presence of any other data, or lack thereof, which accompanies, is appended to, is superimposed on, or is otherwise communicated or able to be communicated with the audio data.

The term "processor" as used herein means data processing devices, apparatus, programs, circuits, systems, and subsystems, whether implemented in hardware, software, or both, and whether used to process data in analog or digital form.

The terms "communicate", "communicated" and "communicating" as used herein include both conveying data from a source to a destination, as well as delivering data to a communications medium, system or link to be conveyed to a destination, as well as transferring or delivering data via a coupling. The term "communication" as used herein means the act of communicating or the data communicated, as appropriate.

The term "network" as used herein includes networks and internetworks of all kinds, including the Internet, and is not limited to any particular network or internetwork.

The term "media data" as used herein means data which is widely accessible, whether over-the-air, or via cable, satellite, network, distributed on storage media, or otherwise, without regard to the form or content thereof, and including but not limited to audio data and video data.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

The term "receiver" as used herein includes one or more devices operative to receive, record, present and/or reproduce media data, regardless of the source for that data.

The term "usage" as used herein includes reception, recording, presentation, reproduction, and/or a combination thereof.

The terms "first" and "second" are used herein to distinguish one element, set, data, object or thing from another, and are not used to designate relative position or arrangement in time.

In accordance with an aspect of the present invention, a method is provided for gathering data concerning usage of media data provided from a predetermined receiver to a user, comprising: gathering first data concerning usage of the media data by the predetermined receiver by means of a stationary monitoring system; gathering second data concerning usage of the media data provided from the predetermined receiver by means of a portable monitor carried on the person of the user, wherein the second data corresponds to at least a portion of the first data; communicating the first data and the second data to a processor; and using the processor to match the second data to the first data, thereby producing audience measurement data concerning usage of the media data provided from the predetermined receiver.

In accordance with another aspect of the present invention, a system is provided for gathering data concerning usage of media data provided from a predetermined receiver to a user, comprising: a stationary monitoring system coupled with the predetermined receiver for gathering first data concerning usage of the media data by the predetermined receiver; a portable monitor carried on the person of the user having an input to receive the media data provided from the predetermined receiver, for gathering second data concerning usage of the media data reproduced by the predetermined receiver, wherein the second data corresponds to at least a portion of the first data; and a processor having at least one input to receive the first data from the stationary monitoring system and the second data from the portable monitor, operative to match the second data to the first data to produce match data, and operative to produce audience measurement data concerning usage of the media data provided from the predetermined receiver based on the match data.

In accordance with a further aspect of the present invention, a method is provided for gathering data concerning usage of media data provided from a predetermined receiver to a user, comprising: gathering first data concerning usage of the media data by the predetermined receiver by means of a stationary monitoring system; gathering second data concerning usage of the media data provided from the predetermined receiver by means of a portable monitor carried on the person of the user, wherein the second data corresponds to at least a portion of the first data; gathering user identification data uniquely identifying the user exposed to the media data; communicating the first data, the second data, and the user identification data to a processor; using the processor to match the second data to the first data, thereby producing audience measurement data concerning usage of the media data provided from the predetermined receiver; and associating the user identification data with the audience measurement data, thereby producing user-specific audience measurement data.

In accordance with an additional aspect of the present invention, a system is provided for gathering data concerning usage of media data provided from a predetermined receiver to a user, comprising: a stationary monitoring system coupled with the predetermined receiver for gathering first data concerning usage of the media data by the predetermined receiver; a portable monitor carried on the person of the user having an input to receive the media data provided from the predetermined receiver, for gathering second data concerning usage of the media data reproduced by the predetermined receiver, wherein the second data comprises at least a portion of the first data; and a processor having at least one input to receive the first data from the stationary monitoring system and the second data from the portable monitor, operative to match the second data to the first data to produce match data, thereby producing audience measurement data concerning usage of the media data provided from the predetermined receiver based on the match data, wherein the processor is operative to gather user identification data uniquely identifying the user exposed to the media data, and wherein the processor is operative to associate the user identification data with the audience measurement data, thereby producing user-specific audience measurement data.

In accordance with still another aspect of the present invention, a method is provided for gathering data concerning usage of media data provided from a predetermined receiver to a user, comprising: gathering first data concerning usage of the media data by the predetermined receiver by means of a stationary monitoring system; gathering second data concerning usage of the media data provided from the predetermined receiver by means of a portable monitor carried on the person of the user; and producing audience measurement data concerning usage of the media data provided from the predetermined receiver from the first data and the second data.

In accordance with a still further aspect of the present invention, a system is provided for gathering data concerning usage of media data provided from a predetermined receiver to a user, comprising: a stationary monitoring system coupled with the predetermined receiver for gathering first data concerning usage of the media data by the predetermined receiver; a portable monitor carried on the person of the user having an input to receive the media data provided from the predetermined receiver, for gathering second data concerning usage of the media data provided from the predetermined receiver; and a processor having at least one input to receive the first data from the stationary monitoring system and the second data from the portable monitor, for producing audience measurement data concerning usage of the media data provided from the predetermined receiver from the first data and the second data.

In accordance with a yet still further aspect of the present invention, a method is provided for gathering data concerning media data provided from a predetermined receiver to a user. The method comprises gathering first data concerning usage of the media data by means of a portable monitor carried on the person of the user; gathering second data concerning usage of media data by the predetermined receiver by means of a monitoring system separate from the portable monitor, the second data corresponding to at least a portion of the first data; and producing audience measurement data based on the first and second data.

In accordance with yet still another aspect of the present invention, a system is provided for gathering data concerning media data provided from a predetermined receiver to a user.

The system comprises a portable monitor carried on the person of the user having an input to receive the media data provided from the predetermined receiver, for gathering first data concerning usage of the media data provided from the predetermined receiver; a monitoring system coupled with the predetermined receiver for gathering second data concerning usage of the media data by the predetermined receiver, the monitoring system being separate from the portable monitor, the second data corresponding to at least a portion of the first data; and a processor having at least one input to receive the first data from the monitoring system and the second data from the portable monitor, for producing audience measurement data concerning usage of the media data provided from the predetermined receiver from the first data and the second data.

In accordance with a still additional aspect of the present invention, a method is provided for gathering data concerning usage of media data provided from a predetermined receiver to a user, comprising: gathering first data concerning usage of the media data by the predetermined receiver by means of a stationary monitoring system, wherein gathering the first data comprises gathering a time code corresponding to a broadcast time of the media data; gathering second data concerning usage of the media data provided from the predetermined receiver by means of a portable monitor carried on the person of the user, wherein the second data corresponds to at least a portion of the first data; gathering at least one of first time of detection data corresponding to a time at which the first data was gathered and second time of detection data corresponding to a time at which the second data was gathered; communicating the first data, the second data, and at least one of the first time of detection data and the second time of detection data to a processor; using the processor to match the second data to the first data, thereby producing audience measurement data concerning usage of the media data provided from the predetermined receiver; and using the processor to produce at least one of first time comparison data and second time comparison data, wherein producing the first time comparison data comprises comparing the time code to the first time of detection data to produce data indicating whether the media data used by the predetermined receiver had been recorded prior to the time at which the first data was gathered, and wherein producing the second time comparison data comprises comparing the time code to the second time of detection data to produce data indicating whether the media data had been recorded prior to receipt thereof by the portable monitor.

In accordance with yet another aspect of the present invention, a system is provided for gathering data concerning usage of media data provided from a predetermined receiver to a user, comprising: a stationary monitoring system coupled with the predetermined receiver for gathering first data concerning usage of the media data by the predetermined receiver, wherein the first data comprises a time code corresponding to a broadcast time of the media data; a portable monitor carried on the person of the user having an input to receive the media data provided from the predetermined receiver, for gathering second data concerning usage of the media data provided from the predetermined receiver, wherein the second data comprises at least a portion of the first data; at least one of a first clock coupled to the stationary monitoring system for gathering first time of detection data corresponding to a time at which the first data was gathered, and a second clock coupled to the portable monitor for gathering second time of detection data corresponding to a time at which the second data was gathered; a processor having at least one input to receive the first data from the stationary monitoring system and the second data from the portable monitor, operative to match the second data to the first data to produce match data, and operative to produce audience measurement data concerning usage of the media data provided from the predetermined receiver based on the match data, wherein the processor is operative to produce at least one of first time comparison data and second time comparison data, wherein the first time comparison data comprises an indication whether the media data used by the predetermined receiver had been recorded prior to the time at which the first data was gathered, based on comparing the time code and the first time detection data, and wherein the second time comparison data comprises an indication whether the media data had been recorded prior to receipt thereof by the portable monitor, based on comparing the time code and the second time detection data.

The invention and its particular features and advantages will become more apparent from the following detailed description considered with reference to the accompanying drawings.

BRIEF DESCRIPTION OF THE DRAWINGS

FIG. 10 illustrates the data gathered by certain embodiments of the present invention;

FIG. 11 is a block diagram of a system for gathering data concerning usage of media data incorporating a base station in communication with a portable monitor, a stationary monitoring system comprising a processor, and a remote location for collecting audience measurement data, in accordance with certain embodiments of the present invention;

FIG. 14 is a block of certain embodiments of the present invention comprising a monitoring system located remotely from a predetermined receiver to be monitored.

DETAILED DESCRIPTION OF CERTAIN ADVANTAGEOUS EMBODIMENTS

Methods and systems are provided for gathering data concerning usage of media data received by a predetermined receiver and reproduced thereby for a user. The particular usage of media data to be monitored varies between particular embodiments, and depending on the embodiment, the usage includes activities such as reception, recording, presentation and/or reproduction of media data, and/or occurrences such as exposure to media data. The particular data gathered concerning the usage of media data also varies between particular embodiments, and depending on the embodiment, includes data useful for identifying the media data to which the user was exposed, such as by identifying a program, station, or channel to which the user was exposed; determining whether the media data had been recorded prior to user exposure; determining whether the user muted an audio portion of the media data; and/or determining whether the user left the vicinity of the receiver that was reproducing the data. In other embodiments, additional usages are monitored, and additional data are gathered.

The particular media data to which the user may be exposed varies between particular embodiments, and in various embodiments, the usage includes one or more of television data, radio data, video cassette data, digital video disk data, digital video recorder data, personal video player data, audio cassette data, compact disk data, personal audio player data, audio data, video data, digital audio data, digital video data, gaming data, streaming media, Internet-supplied data, and personal computer data. In other embodiments, the media data includes other representations of data in a different form or forms. In certain embodiments, therefore, the media data comprises data received by the predetermined receiver, and reproduced upon reception, while in other embodiments the media data comprises data received from a recording medium. In certain embodiments this recorded data includes media data recorded by the user after reception by the predetermined receiver, such as recording a television program with a video cassette recorder, or media data downloaded by the user from the Internet or other network onto a compact disk, while in other embodiments it includes media data purchased or rented by the user, such as movies on digital video disk or video cassette.

Figure 1:
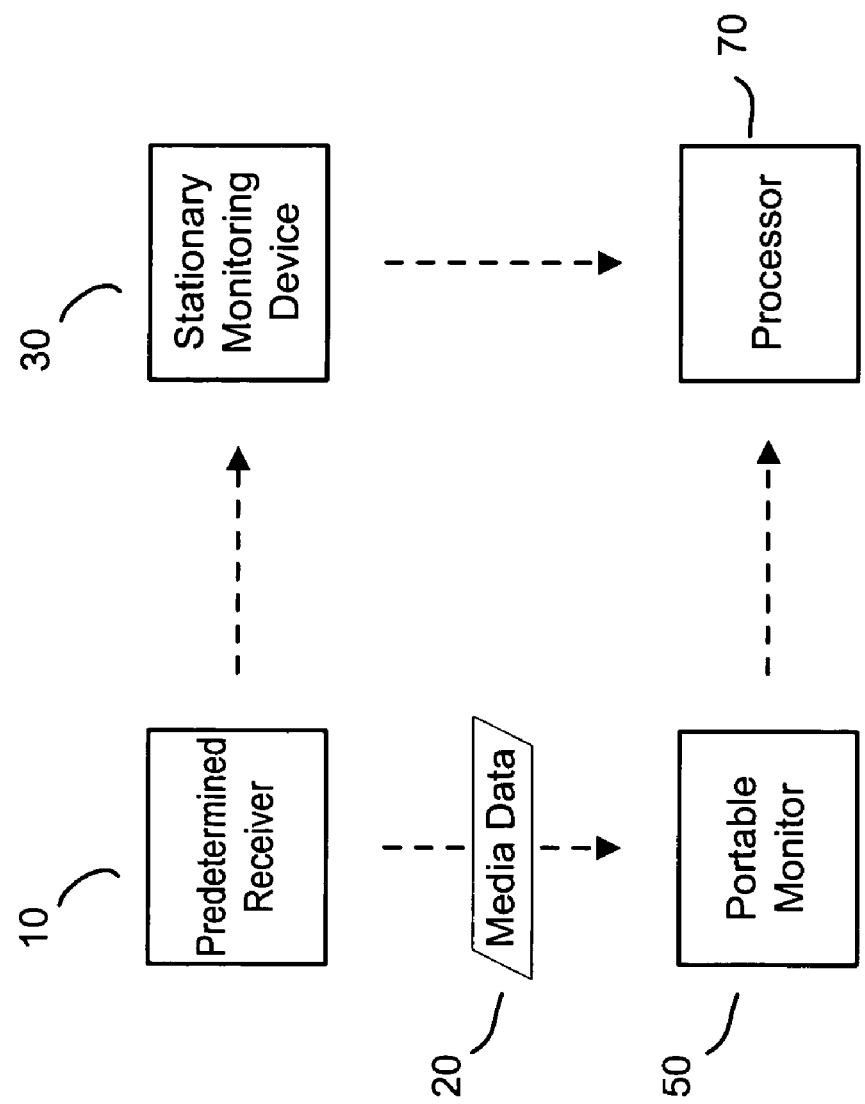
FIG. 1 is a block diagram of a system for gathering data concerning usage of media data comprising a stationary monitoring system, a portable monitor, and a processor, in accordance with certain embodiments of the present invention.

FIG. 1 is an overview of a system for gathering data concerning usage of media data 20 in accordance with certain embodiments of the present invention. The predetermined receiver 10 receives media data 20 from a media data source and reproduces the media data 20. A stationary monitoring system 30 is coupled to the predetermined receiver 10 for gathering first data concerning usage of the media data received by predetermined receiver 10. A portable monitor 50, carried on the person of a user, receives the reproduced media data 20 for gathering second data concerning the media data. The stationary monitoring system 30 communicates the first data to a processor 70, and the portable monitor 50 communicates the second data to the processor 70. The processor 70 is operative to produce audience measurement data based on the first and second data.

The predetermined receiver 10 to be monitored varies between particular embodiments. Depending on the embodiment, the predetermined receiver 10 can be one or more of a media data recording device, a media data playback device, a user-operated recording device, a user-operated playback device, a television, television broadcast reception equipment, a radio, radio broadcast reception equipment, a video cassette player, a digital video disk player, a digital video recorder, a personal video player, an audio cassette player, a compact disk player, a personal audio player, an electronic book and a personal computer. In certain other embodiments the predetermined receiver includes one or more other devices.

The location of the processor 70 varies between particular embodiments. In certain embodiments the processor 70 is located in a household or office, or other location with a receiver to be monitored, adjacent to the predetermined receiver 10, stationary monitoring system 30, and/or personal monitor 50. In other embodiments, the stationary monitoring system 30 and/or the portable monitor 50 comprises or performs the function of the processor 70. In still other embodiments, the processor 70 is located at a remote location, such as a central office, in order to receive data concerning one or a plurality of predetermined receivers from a plurality of households, offices, bars and restaurants, roadside billboards, and/or other locations. In further embodiments, the processor 70 is located in a hub, for example, a hub in a pre-selected household, where the hub is located at a central location within the house as to receive data concerning one or a plurality of predetermined receivers.

Figure 2:
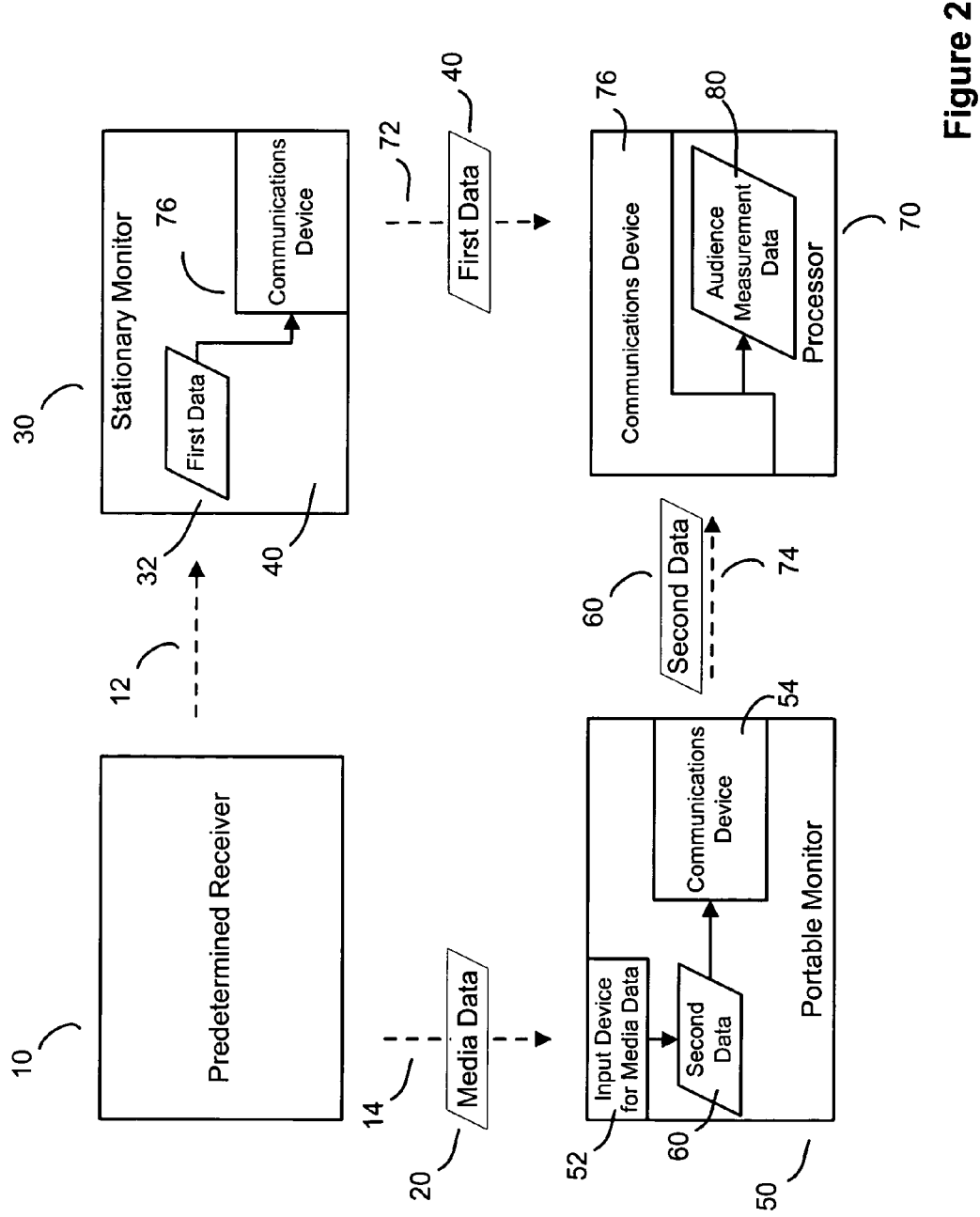
FIG. 2 is a block diagram of certain embodiments of the present invention comprising a stationary monitoring system, a portable monitor, and a processor.

FIG. 2 illustrates certain embodiments of a system for gathering data concerning usage of media data 20. For convenience, FIG. 2 uses the same reference numbers as FIG. 1 for similar elements, but this is not intended to limit the embodiments illustrated by FIG. 1 to those illustrated by FIG. 2. In the system shown in FIG. 2, the predetermined receiver is coupled with the stationary monitoring system 30 via coupling 12, allowing the stationary monitoring system 30 to gather the first data 40. Although in certain embodiments the coupling 12 communicates the media data or portions thereof to the stationary monitoring system 30, in certain other embodiments it does not. In certain embodiments, the coupling 12 comprises a direct connection to a tuning mechanism of the predetermined receiver 10, allowing the stationary monitoring system 30 to determine a station or channel to which the predetermined receiver 10 is tuned. In certain other embodiments, the coupling 12 comprises a direct connection to a local oscillator of the predetermined receiver 10 so that the station or channel tuned to can be determined. In still other embodiments, the stationary monitoring system 30 is physically connected to the predetermined receiver as to receive the media data 20 or a portion thereof. In further embodiments the coupling 30 represents a wireless communication means, such as a radio link or cell phone link, while in others the stationary monitoring system 30 obtains a representation of the media data 20 or a portion thereof through a video camera and/or microphone. After gathering the first data 40, the stationary monitoring system 30 communicates the first data 40 to a communications device 76 in the processor 70 via communications medium 72. Communications medium 72 is wireless, such as a radio link or cellular link, in certain embodiments, and wired, such as a telephone line or power lines, in other embodiments.

The predetermined receiver 10 also communicates the media data 20 to an input device 52 of a portable monitor 50, carried on the person of a user, over communications medium 14, which in certain embodiments comprises a wireless communications medium. In some embodiments, an acoustically reproduced audio portion of media data is communicated to the portable monitor 50, in which case the input device 52 comprises a microphone or other transducer. In other embodiments, the communications medium 14 comprises a radio, infrared, visible light or wired communications link, while in still other embodiments communications medium 14 comprises a cellular link. Upon receiving the media data 20 into the input device 52, the portable monitor gathers the second data 60, and the communications device 54 communicates the second data 60 to the communications device 76 of the processor 70, via communication medium 74. In certain embodiments, the communications medium 74 comprises a wireless communications medium; however, in certain other embodiments, the communications medium 74 comprises a wired link. For example, in some embodiments the portable monitor contains a modem connectable to a telephone line or cellular telephone module, while in other embodiments the portable monitor is operative to be placed in a base station coupled to a telephone line or power lines.

In certain embodiments, the personal monitor 50 includes a motion detector. In certain embodiments, the personal monitor 50 is operative to gather data only when the motion detector indicates it is being carried by a person, and is sensitive enough so that when worn by the user, it will be active based on normal, involuntary movement. In certain embodiments, however, the personal monitor 50 gathers data continuously. When not worn by the user but in the vicinity of the predetermined receiver 10, the lack of motion will be detected by means of the motion detector which is used by the portable monitor to avoid gathering data concerning data to which the user is not exposed and to conserve battery energy.

In certain embodiments, the first data and/or the second data comprise signatures extracted from the media data to be matched with stored reference signatures associated with program, station, network, author, title or other data relating to the media data and useful in producing audience measurement data. Suitable techniques for extracting signatures from media data and matching these signatures to reference signatures are disclosed in U.S. Patent Publication No. US-2003-0005430-A1 to Kolessar, U.S. Pat. No. 5,612,729 to Ellis, et al. and in U.S. Pat. No. 4,739,398 to Thomas, et al., each of which is assigned to the assignee of the present invention and all of which are incorporated herein by reference. Still other suitable techniques are the subject of U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al, U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., and U.S. Pat. No. 4,230,990 to Lert, et al., all of which are incorporated herein by reference.

After receiving the first data 40 from the stationary monitoring system 30, and the second data 60 from the portable monitor 50, the processor 70 produces audience measurement data 80. In certain embodiments, the second data 60 corresponds to at least a portion of the first data 40. Consequently, in order to produce the audience measurement data 80 in certain embodiments, the processor 70 compares the first data 40 to the second data 60 in order to produce match data, and produces audience measurement data 80 based on the match data. For example, in certain embodiments the first data 40 comprises first media data reception data corresponding to at least one of a station, a channel, and a program received by the predetermined receiver 10 and the second data 60 comprises second media data reception data corresponding to at least one of a station, a channel, and a program to which the user was exposed. By comparing the first data 40, such as the first media data reception data, to the second data 60, such as the second media data reception data, the processor 70 produces the audience measurement data 80.

Figure 3:
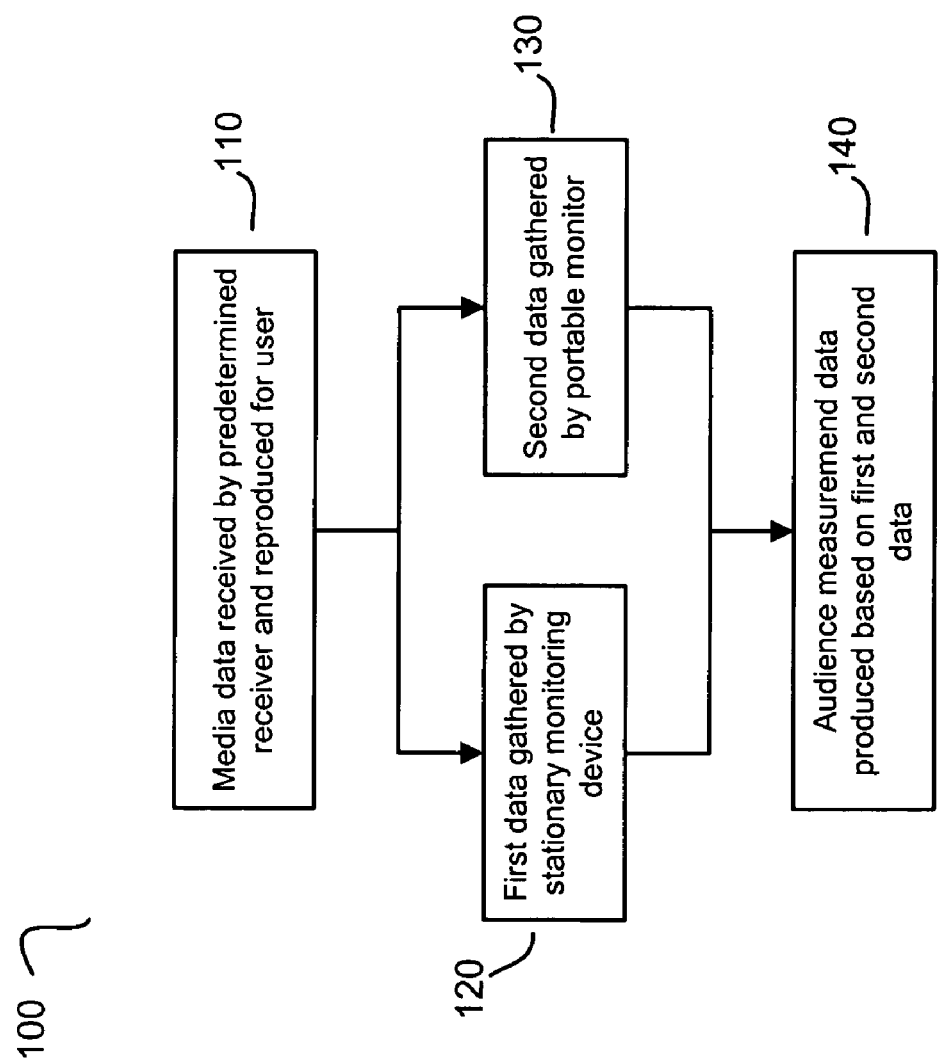
FIG. 3 illustrates a process of gathering audience measurement data according to certain embodiments of the present invention.

FIG. 3 illustrates a process 100 for producing audience measurement data in accordance with certain embodiments of the present invention. Media data is received by a predetermined receiver and reproduced for a user in step 110. As discussed earlier, the media data and the predetermined receiver vary according to the particular embodiment. A stationary monitoring system gathers first data in step 120 and a portable monitor gathers second data in step 130. In the case that the media data is reproduced upon reception, the gathering of the second data will occur at substantially the same time as the gathering of the first data. However, in the case that the media data is recorded upon reception by a media data recording device, such as a digital video recorder, and played back at a later time, wherein the first data represents the time of reception of the media data prior to recording, the gathering of the second data will occur later than the gathering of the first data. After both the first data and second data are gathered, audience measurement data is produced in step 140 based on the first data and second data. In certain embodiments, a processor receives the first data and second data, and produces the audience measurement data. In certain embodiments, the audience measurement data is produced in part by comparing the first data and the second data.

Figure 4:
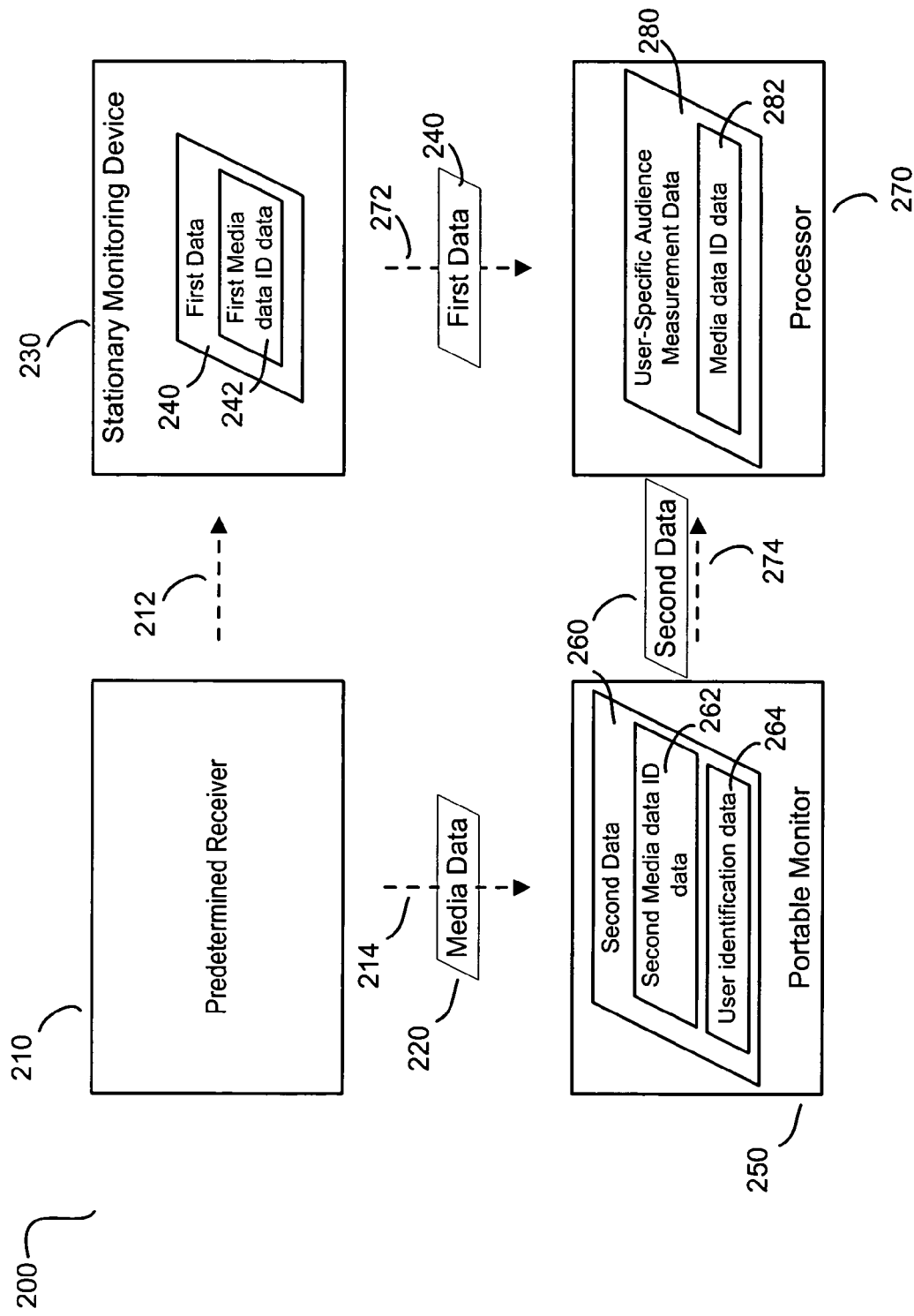
FIG. 4 is a block diagram of certain embodiments of the present invention in which audience measurement data is associated with user data.

FIG. 4 illustrates a system 200 for gathering audience measurement data 280 in accordance with certain embodiments of the present invention. The system 200 has a predetermined receiver 210, which receives media data 220. A stationary monitoring system 230 is coupled to the predetermined receiver 210 through coupling 212 in order to gather first data 240, which comprises first media data identification data 242. The first media data identification data 242 typically identifies the media data 220 or the source of the media data 220. In certain embodiments the media data 220 comprises a television or radio program, and the first media data identification data 242 typically indicates at least one of a station, channel, and program corresponding to the television or radio program. In other embodiments the media data 220 comprises Internet data, and the first media data identification data 242 typically indicates at least one of an Internet address, IP address, URL, website name, FTP address, newsgroup server, or newsgroup address, and email server corresponding to the Internet data. In still other embodiments the media data 220 comprises billboard data, and the media data identification data 242 typically identifies at least one of the subject of the billboard, the location of the billboard, and the advertiser using the billboard. The stationary monitoring system 230 communicates the first data 240 to the processor via communications medium 272. The stationary monitoring system 230 also contains a communications device to communicate the first data 240 to the processor 270, not shown in FIG. 4 for simplicity and clarity.

The predetermined receiver 210 also communicates the media data 220 to the portable monitor 250 via communications medium 214, and the portable monitor 250 gathers second data 260. The second data 260 contains second media data identification data 262, which comprises any of the information previously described above concerning the first media data identification data 242. The second data 260 also contains user identification data 264, which uniquely identifies the user of the portable monitor 250 or the portable monitor 250 itself. In the latter case, the data identifying the portable monitor 250 is later associated with the user. The portable monitor 250 communicates the second data 274 to the processor 270. The portable monitor 250 also contains an input device for receiving the media data 220 from the predetermined receiver 210 and a communications device to communicate the second data 260 to the processor 270, not shown in FIG. 4 for simplicity and clarity.

Based on the first data 240 and the second data 260, the processor 270 produces user-specific audience measurement data 280, corresponding to the media data 220 to which the user identified by the user identification data 264 was exposed. As before, in certain embodiments, the second data 260 corresponds to at least a part of the first data 240, and the processor 270 compares the first data 240 and the second data 260 in order to produce match data, and produces the user-specific audience measurement data 280 based on the match data. The processor 270 also contains at least one communications device to receive the first data 240 and the second data 260, not shown for simplicity and clarity.

Figure 5:
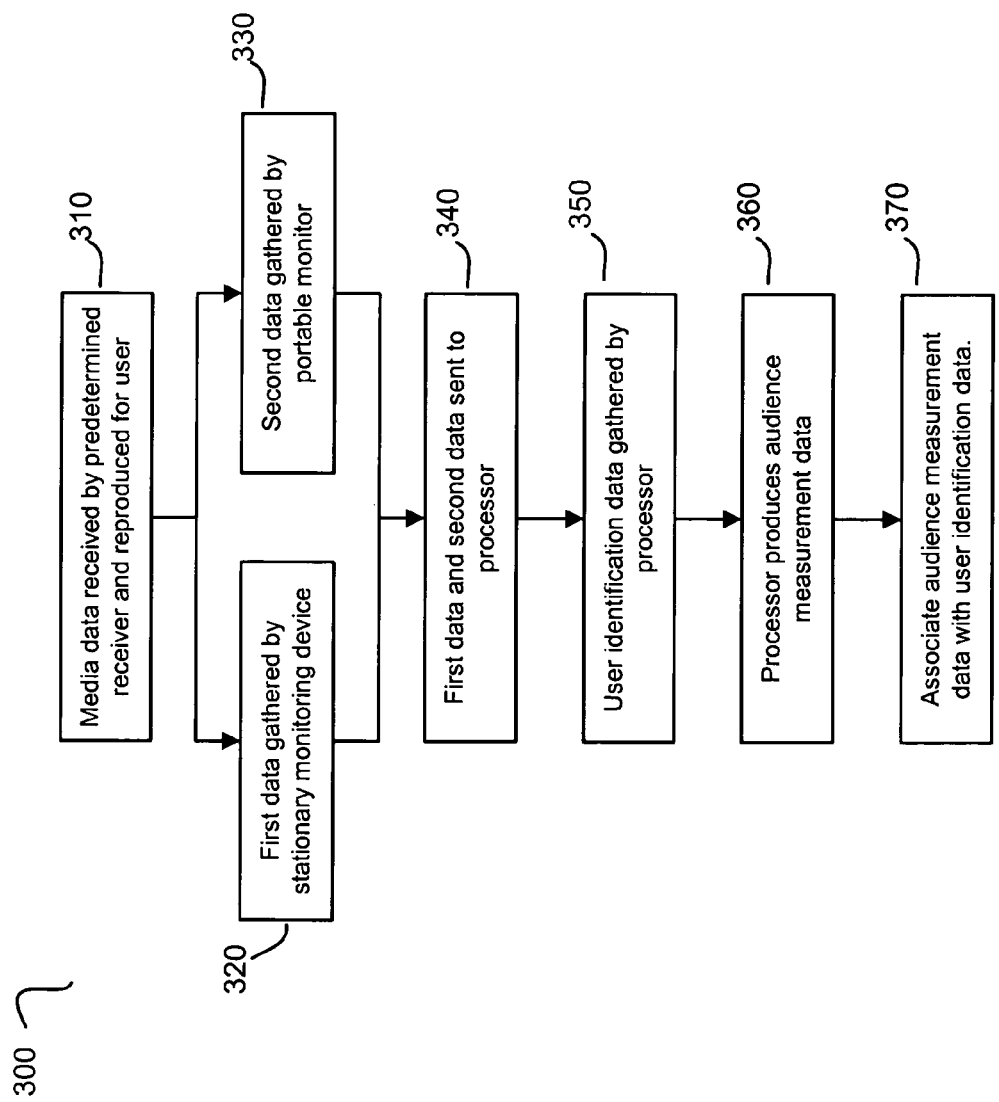
FIG. 5 is a flow chart illustrating a process of gathering user-specific audience measurement data according to certain embodiments of the present invention.

FIG. 5 illustrates a process 300 for gathering audience measurement data associated with a specific user according to certain embodiments of the present invention. First, the media data is received by a predetermined receiver and reproduced for a user in step 310. Subsequently, the stationary monitoring system gathers the first data in step 320, and the portable monitor gathers the second data in step 330. The first and second data are communicated to the processor in step 340, and the processor also gathers user identification data in step 350. Depending on the embodiment, the processor gathers the user identification data before, after, or substantially at the same time as the first and second data are communicated to the processor. In certain embodiments, the second data comprises the user identification data. In other embodiments, the user indicates his or her presence to the processor at any time via the user of a push button device, such as a remote control or people meter. In still other embodiments, the user wears a personal identification tag, and the processor identifies the user based on that tag, before, subsequent to, or after receiving the first data and second data. In further embodiments, the user identification data is gathered by a technique that employs the detection of ultrasonic echoes or radiation from the individuals present. In step 360 the processor produces audience measurement data, which is then associated with the user identification data in step 370 to produce user-specific audience measurement data.

Figure 6:
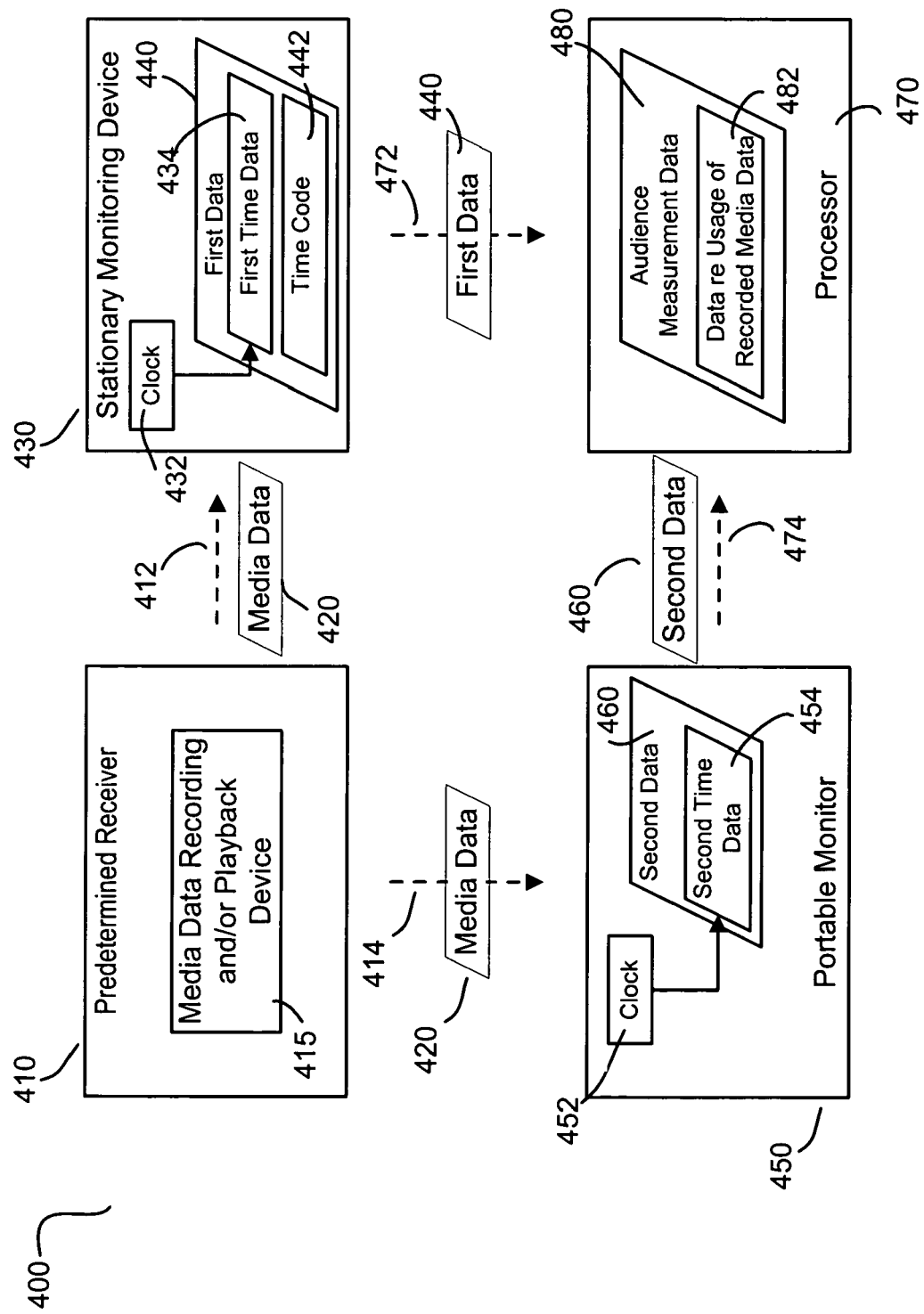
FIG. 6 is a block diagram of certain embodiments of the present invention for monitoring a predetermined receiver comprising a media data recording and/or playback device.

FIG. 6 illustrates a system 400 for gathering audience measurement data 480 in accordance with certain embodiments of the present invention. A predetermined receiver 410, comprising media data recording and/or playback device 415, receives media data 420. In certain cases, the media data 420 is received from a television or radio broadcast, and then either reproduced immediately for the user or recorded by the media data recording and/or playback device 415. In other cases the media data 420 is received from a recording medium by the media data recording and/or playback device 415, and reproduced from the recording medium for the user. The media data recording and/or playback device 415 varies, but can be, without limitation, one or more of a media data recording device, a media data playback device, a user-operated recording device, a user-operated playback device, a video cassette player, a digital video disk player, a digital video recorder, a personal video player, an audio cassette player, a compact disk player, a personal audio player, an electronic book and/or a personal computer. In certain other embodiments the media data recording and/or playback device 415 also includes one or more other devices. In certain embodiments, the media data recording and/or playback device 415 comprises a personal video recorder, such as a TiVo® device.

The predetermined receiver 410 is coupled to stationary monitoring system 430 via communications 412. The stationary monitoring system 430 gathers first data 440 corresponding to the media data 420 received by the predetermined receiver, where the first data 440 comprises a time code 442 gathered from the media data 420. Although the time code 442 is gathered from the media data 420, in the embodiments in which the first data 440 contains other data aside from the time code, the other data is not necessarily gathered from the media data. Instead, as described hereinabove, in some embodiments the stationary monitoring system 430 is coupled to the predetermined receiver 410 in order to determine a tuning status. However, in other embodiments, additional data contained in the first data 440 is gathered directly from the media data 420. The stationary monitoring system 430 has a clock 432, enabling it to also gather first time data 434. In certain embodiments, the first time data 434 is a first time of detection data, corresponding to the time at which the stationary monitoring system 430 gathered the first data 440. In other embodiments, the first time data 434 corresponds to at least one of a time of reception of the media data 420 by the predetermined receiver 410 and a time of recording thereof by the media data recording and/or playback device 415. The stationary monitoring system 430 subsequently communicates the first data 440, comprising the first time data 434 and the time code 442 to the processor 470. The stationary monitoring system also contains an input to receive the media data 420 from the predetermined receiver 410 and a communications device to communicate the first data 440 to the processor 470, not shown for simplicity and clarity.

In certain embodiments, additional data gathered by the stationary monitor as part of the first data 440 includes indication of an operational status of the predetermined receiver 410. In some embodiments, the operational status is determined based on at least one of the time code 442 and the first time data 434. For example, if the time code 442 corresponds to a time ("first time data time") at which a movie, representing the media data 420, was recorded onto a digital video disk by a recording company, and the first time data 434 corresponds to the time ("first time data time") at which the predetermined receiver 410 received the media data 420, the stationary monitoring system 430 determines that the media data 420 had been recorded because the first time data time is sufficiently later than the time code time, and hence, the predetermined receiver 410 must be playing back the media data 420. Thus, the operational status reported corresponds to a playback mode of the predetermined receiver 410, specifically, of the media data recording and/or playback device 415 contained in the predetermined receiver 410.

The predetermined receiver 410 communicates the media data 420 to the portable monitor 450 via communications medium 414. The portable monitor 450 gathers second data 460 corresponding to the media data 420. The portable monitor 350 also contains a clock 452 in order to gather second time data 454. In certain embodiments the second time data 454 comprises a second time of detection data, corresponding to the time at which the portable monitor gathered the second data, while in other embodiments, the second time data 454 corresponds to a time of reproduction of media data 420 recorded by the media data recording and/or playback device 415. Although not depicted in FIG. 6 for purposes of simplicity and clarity, in some embodiments the portable monitor 450 collects a time code in addition to or instead of the stationary monitoring system 430. In certain embodiments the portable monitor also is operative to determine an operational status of the predetermined receiver 410 based on this time code in a similar fashion to the stationary monitoring system 430. In other embodiments the portable monitor 450 determines whether the media data 420 was recorded prior to reception by the portable monitor 450, by comparing the second time data 454 with either the time code 434 gathered by the stationary monitoring system 430 and communicated thereby to the portable monitor 450, or a time code gathered by the portable monitor 450. The portable monitor 450 communicates the second data 460 comprising the second time data 454 to the processor 470 via communications medium 460. The portable monitor 450 also contains an input to receive the media data 420 from the predetermined receiver 410 and a communications device to communicate the second data 460 to the processor 470, not shown for simplicity and clarity.

The processor 470, after receiving the first data 440 and the second data 460, produces audience measurement data 480 concerning usage of recorded media data. The data concerning usage of recorded media data 482, based on at least one of the time code 442, first time data 434, and second time data 454, varies between particular embodiments, and depending on the embodiment, can include one or more of an indication as to whether the media data 420 had been recorded prior to gathering the first data 440, whether the media data 420 had been recorded prior to gathering the second data 460, whether the media data 420 had been recorded prior to reception by the predetermined receiver 410, whether the media data 420 had been recorded prior to reproduction of the media data 420, whether the media data 420 had been recorded by the media data recording and/or playback device 415 prior to reproduction of the media data 420, and whether the media data 420 had been recorded prior to reception of the media data 420 by the portable monitoring device 450, as well as indicating when such recording occurred. The processor 470 also contains a communications device to receive the first data 440 and the second data 460, not shown for simplicity and clarity.

In some embodiments, data concerning usage of recorded media data 482 is produced by either the stationary monitoring system or the portable monitor, and communicated to the processor. In other embodiments, the processor is operative to produce the data concerning usage of recorded media data 482. For example, when the first time data 434 corresponds to at least one of a time of reception of the media data 420 by the predetermined receiver 410 and a time of recoding thereof by the media data recording and/or playback device 415, and the second time data 454 corresponds to a time of reproduction of the media data 420 recorded by the media data recording and/or playback device 415, the processor 470 produces the data concerning usage of recorded media data 482 indicating that the media data recording and/or playback device 415 recorded the media data 420 prior to reproduction. In other embodiments, the processor 470 compares the time code 442 with the first time data 454, which is a first time of detection data, to produce data indicating whether the reproduced media data 220 had been recorded prior to the time when the first data was gathered. In certain embodiments, the data concerning usage of recorded media data 482 produced by the processor 470 reflects an operational status of the predetermined receiver 410, and is produced based on at least one of the time code 442, the first time data 434, and the second time data 454. In the case that the portable monitor 450 collects a time code instead of or in addition to the stationary monitoring system 430, the processor 470 can use that time code to produce the data concerning usage of recorded media data 482. Additionally, in certain embodiments the audience measurement data 480 comprises data reflecting a proportion or amount of media data recorded by the predetermined receiver 410, specifically, the media data recording and/or playback device 415, to which the user was exposed. For example, the audience measurement data 480 may contain data indicating a percentage of television programs that the user watched after recording them with a video cassette recorder.

Although FIG. 6 shows the gathering of all three of the time code 442, first time data 434, and second time data 454, in various embodiments, any one or two of the three are gathered in accordance with the particular data to be produced.

Figure 7:
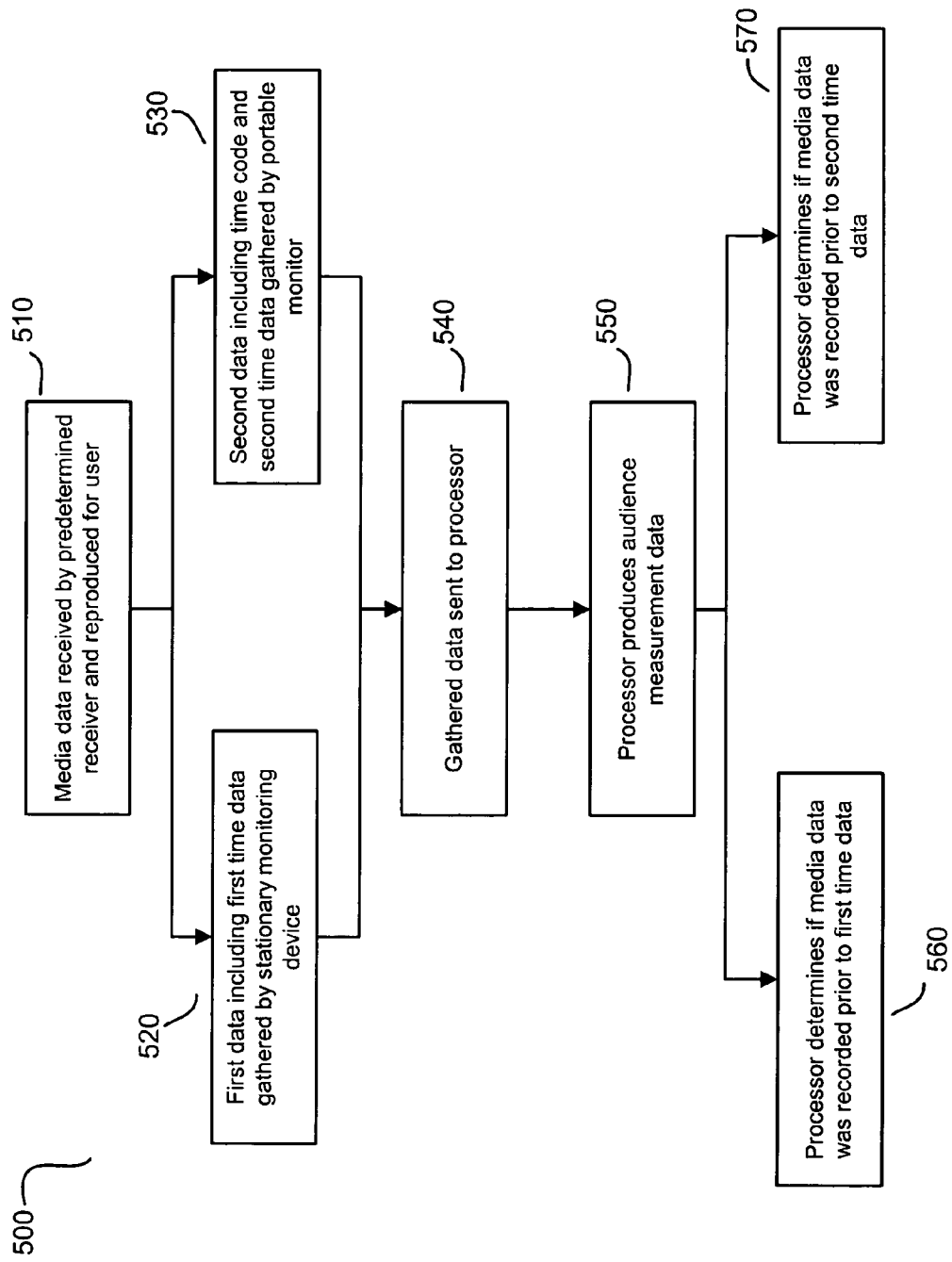
FIG. 7 is a flow chart illustrating a process of gathering data pertaining to a media data recording and/or playback device in accordance with certain embodiments of the present invention.

FIG. 7 illustrates a process 500 used in certain embodiments of the present invention to produce audience measurement data along with data concerning media recording and/or playback devices. The media data is received by the predetermined receiver and reproduced for the user in step 510. Subsequently, a stationary monitor gathers first data including first time data (step 520), and a portable monitor gathers second data including time code and/or second time data (step 530). Although FIG. 7 depicts the portable monitor gathering the time code, in other embodiments the stationary monitoring system may gather a time code in addition to or instead of the portable monitor. The gathered data are communicated to a processor (step 540), which produces audience measurement data (step 550). The processor determines whether the media data was recorded prior to the first time data by comparing the time code and the first time data (step 560) and whether the media data was recorded prior to the second time data by comparing the time code and the second time data (step 570). In the case that the first time data corresponds to the time that the predetermined receiver received the media data, the processor determines whether the data was recorded prior to such reception. In the case that the second time data corresponds to the time that the portable monitor received the media data, the processor determines whether the data was recorded prior to such reception. In various embodiments, different determinations are made according to the times to which the first time data and second time data correspond. In various embodiments, steps 560 and 570 are performed in any order, the data collected in these steps is be collected before, after, or at substantially the same time as any audience measurement data collected in step 550. In certain embodiments, the audience measurement data collected in step 550 encompasses the data collected in steps 560 and 570.

Figure 8:
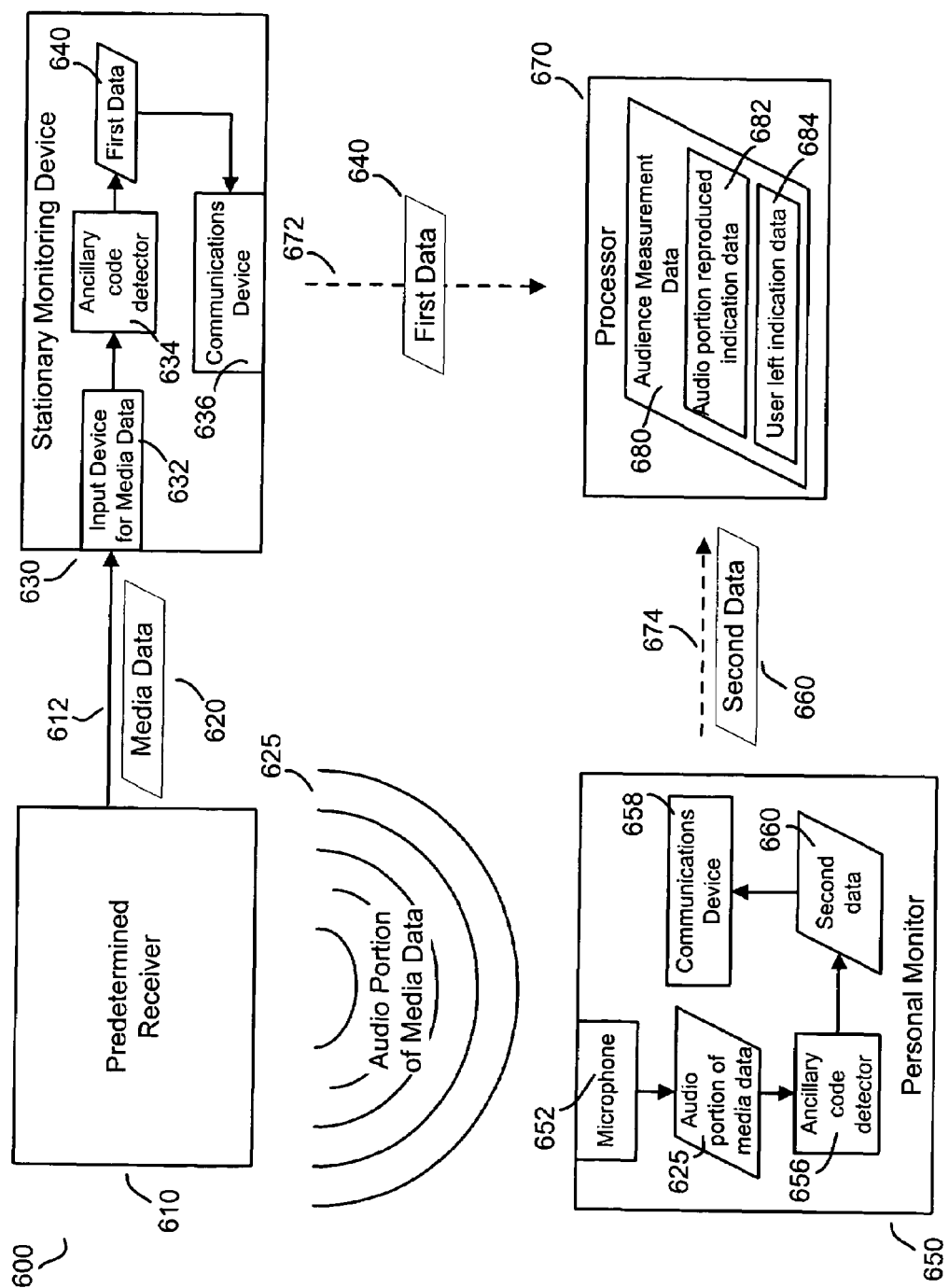
FIG. 8 is a block diagram of a system for gathering data concerning usage of media data incorporating the use of ancillary codes in audio data received by a portable monitor in accordance with certain embodiments of the present invention.

FIG. 8 illustrates a system 600 for gathering audience measurement data including an indication of whether an audio portion 625 was reproduced and whether a user left a vicinity of a predetermined receiver 610 in accordance with certain embodiments of the present invention. The predetermined receiver 610 receives, presents or reproduces media data, of which at least a portion 620 is communicated to an input device 632 of a stationary monitoring system 620 via communications medium 612, which can be wired or wireless. In certain embodiments, the stationary monitoring system 630 receives an audio portion of the media data 620. In some of these embodiments, the communications medium 612 comprises a physical coupling from an audio output of the predetermined receiver 610 to the input device 632. In certain embodiments input device 632 comprises a microphone, electrical or magnetic field sensitive device, antenna, optical input or other wireless receiving device or transducer. In other embodiments, the stationary monitoring system 630 receives a video portion of the media data 620. In still other embodiments, the stationary monitoring system 630 receives one or more data packets of digital media data, such as a digital television broadcast. Subsequent to receiving the media data 620, or a portion thereof, the stationary monitoring system 630 detects an ancillary code using an ancillary code detector 634, and gathers first data 640 based on the first ancillary code. Thus, in various embodiments, the first ancillary code is gathered from an audio portion of the media data 620, a video portion of the media data 620, or a data packet. The stationary monitoring system 630 gathers first data 640 based on the first ancillary code, and communicates it to a processor 670 via communications device 636 and communications medium 672. In certain embodiments, the first data 640 comprises an indication of a station, a channel, and/or a program received by the predetermined receiver 610.

The predetermined receiver 610 additionally communicates an audio portion 625 of the media data 620 to an audio receiver, depicted as a microphone 652, of a portable monitor 650. Although FIG. 6 shows a microphone 652 as the audio receiver in the portable monitor 650, in certain other embodiments other audio reception equipment is used. The portable monitor 650 has an ancillary code detector 656 to detect a first ancillary code in the audio portion 625, and the portable monitor 650 then gathers the second data 660 based on the ancillary code. In certain embodiments, the second data 660 comprises detection error data produced by the portable monitor 650. The detection error data indicates the success of the portable monitor 650 detecting the second ancillary code. Also, in certain embodiments, the second data 640 comprises an indication of a station, a channel, and/or a program reproduced by the predetermined receiver 610. Further, in certain embodiments, the first and second ancillary codes are the same code, while in other embodiments they are different codes. The second data 650 is then communicated to the processor 670 via communications device 658 and communications medium 674.

Suitable decoding techniques for detecting ancillary codes are the subject of U.S. Pat. No. 5,450,490 and No. 5,764,763 to Jensen, et al., U.S. Pat. No. 5,579,124 to Aijala, et al., U.S. Pat. Nos. 5,574,962, 5,581,800 and 5,787,334 to Fardeau, et al., U.S. patent application Ser. No. 09/318,045, in the names of Neuhauser, et al. filed May 25, 1999, U.S. patent application Ser. No. 09/948,283 to Kolessar, et al. filed Sep. 7, 2001 and U.S. patent application Ser. No. 10/302,309 to Jensen, et al., filed Nov. 22, 2002, each of which is assigned to the assignee of the present application and all of which are incorporated herein by reference. Still other suitable decoding techniques are the subject of PCT Publication WO 00/04662 to Srinvasan, U.S. Pat. No. 5,319,735 to Preuss, et al., U.S. Pat. No. 6,175,627 to Petrovich, et al., U.S. Pat. No. 5,828, 325 to Wolosewicz, et al., U.S. Pat. No. 6,154,484 to Lee et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al., all of which are incorporated herein by reference.

In certain embodiments, the portable monitor also communicates data concerning the identity of the user to the processor, so that the audience measurement data produced is associated with a particular user. In some such embodiments, the user identification data is communicated based on the portable monitor detecting an ancillary code in the audio portion 625 of the media data 620. In certain embodiments, the ancillary code comprises the same code as the one conveying the second data, and the portable monitor 650 communicates user identification data uniquely identifying the user. In other embodiments, the ancillary code comprises a different code, specifically addressing portable monitor 650, as opposed to any other portable monitors that may be present, and the user identification data comprises logging data, that is attributed to the user of portable monitor 650 by the processor 670 based on the time at which the user identification data was communicated.

The processor 670 receives the first data 640 and the second data 660 and produces audience measurement data 680 based on these data. The audience measurement data 680 includes audio portion reproduced indication data 682, which indicates whether the audio portion 625 of the media data 220 was reproduced. In certain embodiments, the processor 670 produces the audio portion reproduced indication data 682 based on the first data and the second data. In some embodiments, if the second data 660 indicates a substantially high detection error rate, the processor 670 concludes that the predetermined receiver 610 did not reproduce the audio portion 625 of the media data 620. In other embodiments, the processor concludes that the predetermined receiver 610 did not reproduce the audio portion 625 based on the lack of an indication in the second data 660 of at least one of a station, a channel, and a program to which the user was exposed, along with an indication in the first data 640 that some other portion, such as the video portion, of the media data 420 was in fact reproduced, and a signal or data indicating the presence of the user, such as the second data 660 or user identification data. In still other embodiments, lack of reproduction of the audio portion 625 is detected by examining audience measurement data corresponding to three consecutive time periods, wherein during the first and third time periods the second data 660 provided identification information and/or a relatively low detection error rate, but during the second time period, the second data provided no such identification information and/ or a relatively high detection error rate. In certain embodiments, the lack of reproduction of the audio portion 625 is used to signify that the user muted the audio portion 625.

The audience measurement data 680 also includes user left indication data 684, which indicates that the user left a vicinity of the predetermined receiver 610. In certain embodiments, the processor 670 produces this data based on the first data 640 and the second data 660. In some embodiments, the processor 670 concludes that the user left the vicinity of the predetermined receiver 610 by an increasing detection error rate, as reported by the second data 660.

Figure 9A:
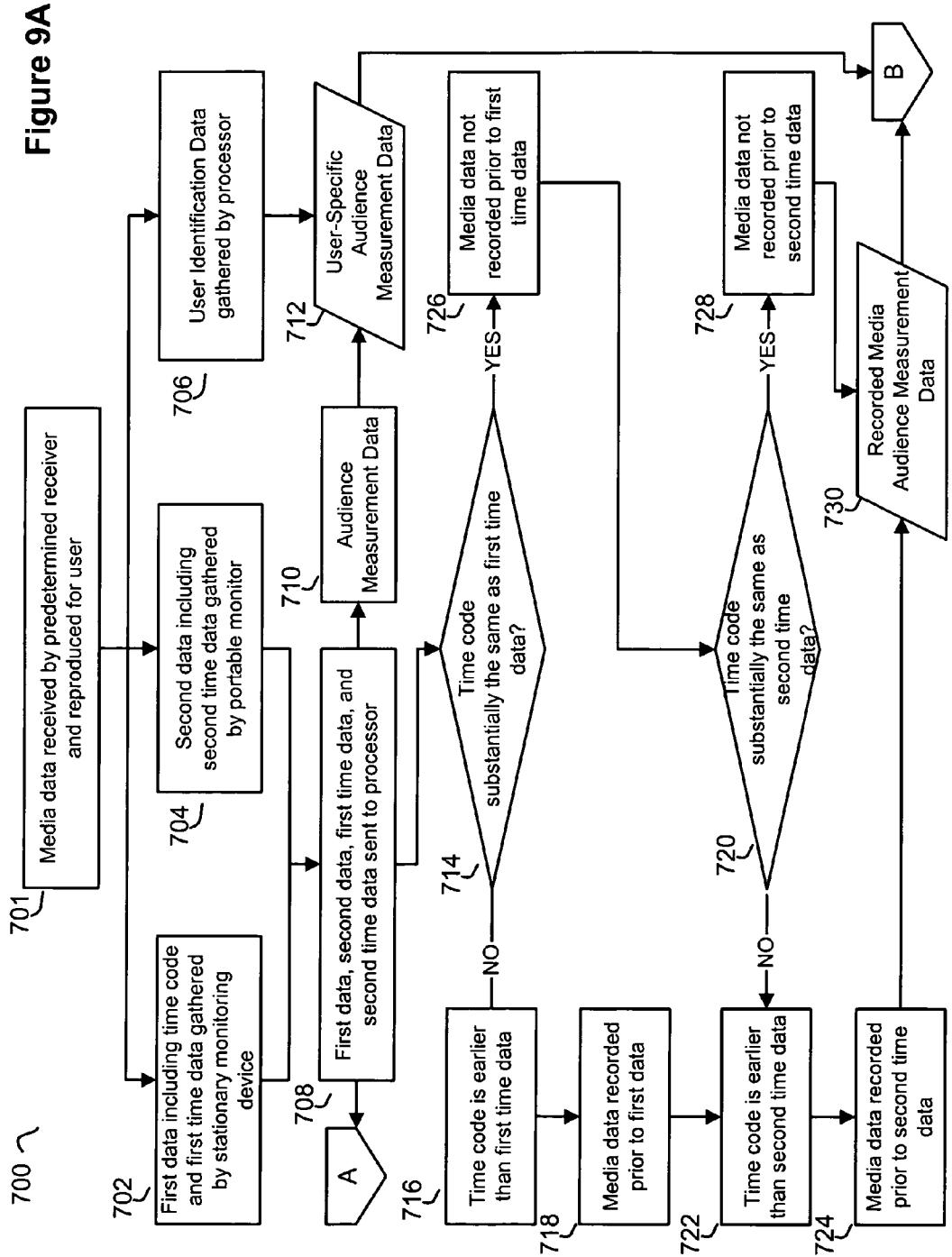
FIGS. 9A and 9B illustrate a process of gathering user-specific audience measurement data, recorded media audience measurement data, muting audience measurement data, and left vicinity audience measurement data, in accordance with certain embodiments of the present invention.
Figure 9B:
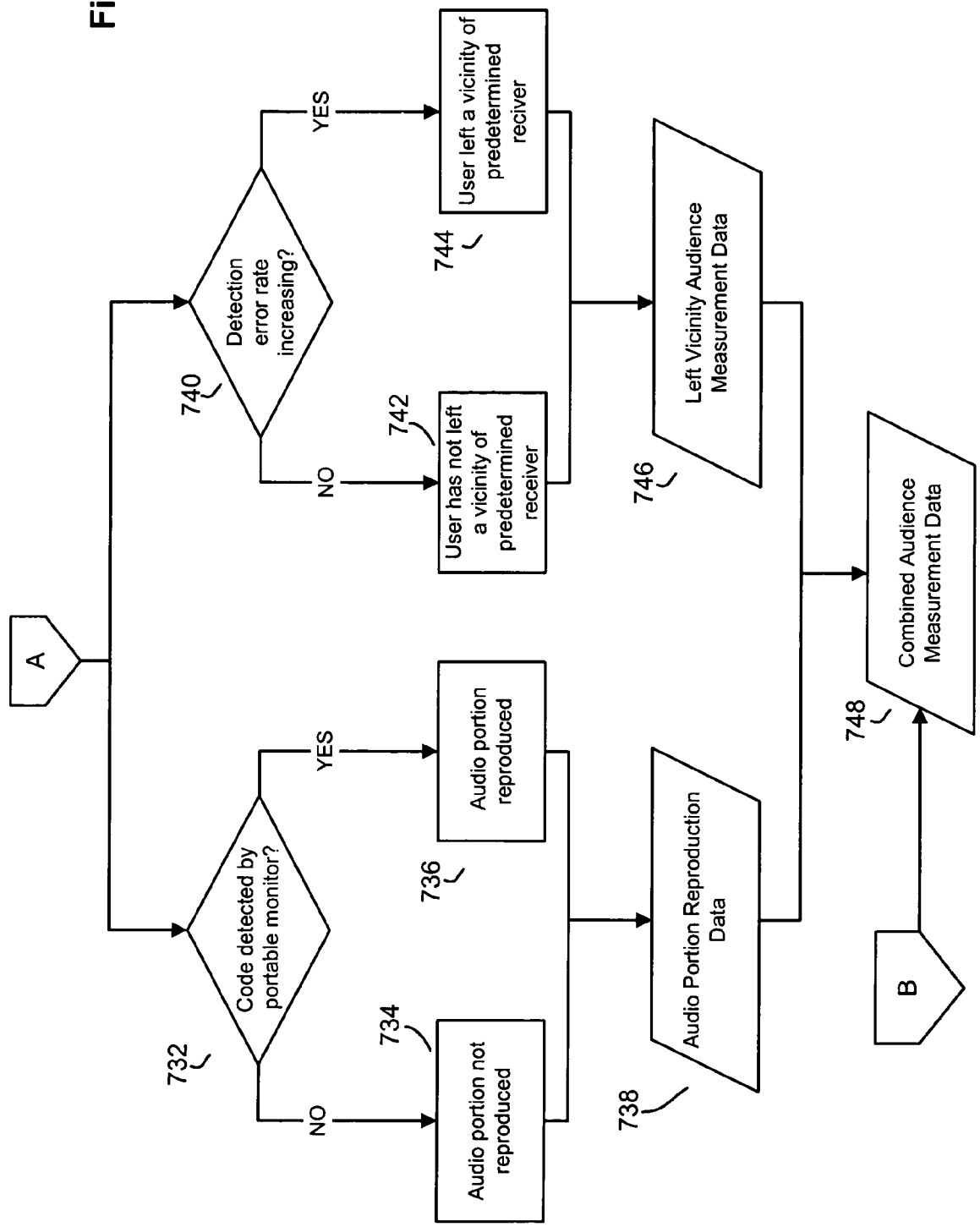

FIGS. 9A and 9B illustrate a process 700 of gathering audience measurement data in accordance with certain embodiments of the present invention. Referring at first to FIG. 9A, media data is received by a predetermined receiver and reproduced for one or more users (step 701). The stationary monitoring system gathers first data including a time code and first time data (step 702), and the portable monitor gathers second data including second time data (step 704). In certain embodiments, the first data, second data, and/or portions thereof, are encoded in the media data in the form of ancillary codes. In certain embodiments, such data is produced by extracting signatures from the media data. In some embodiments, the stationary monitoring system gathers the first data, or portions thereof, from a data packet in a digital broadcast channel received by the predetermined receiver, wherein the first data comprises an indication of at least one of a station, a channel, and a program, received by the predetermined receiver. In other embodiments, the first data is based on an ancillary code encoded in a video or audio portion of the media data. In certain embodiments, the second data is based on an ancillary code encoded in an audio portion of the media data.

The processor also gathers user identification data (step 706). In certain embodiments, the user identification data is communicated from the portable monitor to the processor. In other embodiments, the user indicates his or her presence through the user of a push-button device such as a remote control or people meter. In still other embodiments, the user wears a personal identification tag. In yet other embodiments, ultrasonic or light radiation is used to identify the user.

The first data and second data are communicated to the processor (step 708), which produces the audience measurement data based on the first data and the second data (step 710). In certain embodiments, the second data is communicated directly from the portable monitor to the processor via a wired or wireless communications medium. In other embodiments, the second data is communicated from the portable monitor to a base station in which it can be placed, and then from the base station to the processor via a wired or wireless communications medium.

Referring now to FIG. 9B at A, the processor evaluates whether the code was detected with sufficient confidence based on the detection error data (step 732). If a code was detected with sufficient confidence, then it is determined that the audio portion was reproduced (step 736); on the other hand, if a code was not detected with sufficient confidence, then it is determined that the audio portion was not reproduced (step 734). From this determination, the processor produces audio portion reproduction data (step 738). The processor also evaluates whether the detection error rate is increasing. If it is not increasing to a sufficient extent, then the processor determines that the user has not left the vicinity of the predetermined receiver; on the other hand, if it is increasing to a sufficient extent (step 742), then the processor determines that the user has left the vicinity of the predetermined receiver (step 744). From this determination, the processor produces "left vicinity" audience measurement data (step 746). The audio portion reproduction data and left vicinity audience measurement data become part of the combined audience measurement data (step 748).

Referring again to FIG. 9A, the user identification data gathered by the processor in step 706 is associated with the audience measurement data produced in step 710 to produce user-specific audience measurement data (step 712). As seen in FIG. 9B at B, this data becomes part of the combined audience measurement data (step 748).

In step 714 of FIG. 9A, the time to which the time code corresponds ("time code time") is compared to the time to which the first time data corresponds ("first time data time"). If the two times are not substantially the same, then time code time is earlier (step 716), as the time code time is no later than the time of reception by the predetermined receiver, and the first time data time is no earlier than the reception by the predetermined receiver. If the time code time is earlier, then the media data was recorded prior to the first time data time (step 718). In certain embodiments the first time data time is a time of reception of the media data by the predetermined receiver, in which case it is determined that the media data was recorded prior to such reception. Since the time code time is earlier than the first time data time, as found in step 716, the time code time is also earlier than the time to which the second time data corresponds ("second time data time") (step 722), as the second time data time is no earlier than the first time data time. Thus, the media data was recorded prior to the second time data time (step 724). In certain embodiments, the second time data time is the time of reproduction of media data, in which case it can be determined whether the media data was recorded prior to reproduction. In certain embodiments where the predetermined receiver comprises a media data recording device, the first time data time is a time of reception of media data, and the second time data time is a time of reproduction of media data, if the time code time is substantially the same as the first data, but earlier than the second data, the processor can conclude that the media data was recorded by the media data recording device before being reproduced for the user. Based on such determinations, the processor produces recorded media audience measurement data (step 730). Referring to FIG. 9B at B, the recorded media audience measurement data is part of the combined audience measurement data (step 748).

Referring back to step 714 of FIG. 9A, if the time code time is substantially the same time as the first time data time, then the media data was not recorded prior to the first time data time (step 726). Next, in step 720, it is determined whether the time code time is substantially the same as the second time data time. If the two times are not substantially the same, the process continues with step 722 as described above. If they are substantially the same, however, it is concluded that the media data was not recorded prior to the second time data time (step 728). The processor then produces the recorded media audience measurement data based on such determinations (step 730). In certain embodiments, the first time data represents a time of reception by the predetermined receiver and the second time data represents a time of reproduction by the predetermined receiver; thus, if step 728 is reached, the processor can conclude that the media data was reproduced at substantially the same time as reception. Referring to FIG. 9B at B, the recorded media audience measurement data forms part of the combined audience measurement data (step 748).

FIG. 10 is an exemplary table of the data that is collected in accordance with certain embodiments of the present invention. The table corresponds to usage of media data from a television from a time period from 11:00:00 to 11:05:46 on Jul. 8, 2003, where time is recorded on a 24-hour clock. The stationary monitoring system gathers first data comprising first channel identification data and time code. The time code has the form MMDDYY.HHMMSS, where M=Month, D=Day, Y=Year, H=Hour, M=Minute, and S=Second. The portable monitor gathers second data, including user identification data (a seven digit number in the embodiments illustrated by FIG. 10), second channel identification data corresponding to the channel identification data gathered by the stationary monitoring system, time of detection data (same format as the time code) corresponding to the time at which the second data was gathered, and detection error rate data. For the detection error rate data, the numerals 1, 2, 3, and 4 represent four levels of increasing relative error, while 999 represents the failure to detect a code at even a minimum acceptable level. Although in the depicted embodiment the first data and second data comprise an indication of a channel to which the user was exposed, in various embodiments the first data and second data comprise an indication of at least one of a station, a channel, and a program to which the user was exposed. The processor produces audience measurement data based on the first data and the second data. The audience measurement data includes channel identification data and "other data." The "other data" includes recorded media audience measurement data, muting audience measurement data, and left vicinity audience measurement data.

In the embodiment to be described, the only time-related data used in producing the audience measurement data are the time code gathered by the stationary monitoring system, and the time of detection data gathered by the portable monitor; thus, the actual time is only known when the portable monitor takes data, which, as will be described, is less frequent than the stationary monitoring system in this embodiment. In other embodiments, the stationary monitoring system gathers time of detection data in addition to or instead of the portable monitoring device, which provides for a more frequent actual time record. In still other embodiments, relative times are used as opposed to absolute times for one or more of the time-related data.

Note that from 11:00:00 to 11:05:40, data is provided from the stationary monitoring system at twenty-second intervals, but from the portable monitor at one-minute intervals, and from 11:05:40 to 11;05:46, data is provided from the stationary monitoring system at two-second intervals. In other embodiments the stationary monitoring system and/or the portable monitor collect data more or less often. However, as in certain embodiments the portable monitor gathers the second data based on an ancillary code in an audio portion of the media data through the use of a microphone, in these embodiments, the stationary monitoring system resolves the first data within a first time interval that is shorter than a second time interval in which the portable monitor resolves the second data. In some such embodiments, the stationary monitoring system also gathers the first data based on an ancillary code in audio media data, but through an audio output cable, typically allowing for faster code detection than would be possible with a microphone. The italicized channel identification data produced by the processor are indicative of correspondences between the data collected by the first channel identification data and the second channel identification data, whereas the block print channel identification data produced by the processor are indicative of the first channel identification data from the stationary monitoring system. Although the portable monitor was not able to resolve channel identification data in these shorter time intervals, the detection error rate was low enough that the processor could conclude that the user was indeed exposed to the media data corresponding to the first channel identification data. Hence, by comparing the first data to the second data, such as the first channel identification data and the second channel identification data, and detecting a correspondence there between, the processor can produce audience measurement data in a third time interval shorter than the time interval of the data collected by the portable monitor. This is evident in FIG. 10, as between 11:00:00 and 11:05:40, audience measurement data is produced at twenty-second intervals despite the fact that the portable monitor collected data over one-minute intervals. In certain embodiments, the first time interval and second time interval are selected as appropriate, while the third time interval is shorter than either of the first time interval and second time interval.

The data gathered at 11:00:00 indicates that the user was exposed to the media data at the time of its reception by the receiver, as the time of detection data was the same as the time code. Further, as the detection error rate was relatively low, it was determined that the audio portion was reproduced (and not muted). The channel identification data produced was based on a correspondence between the data from the stationary monitoring system and the portable monitor. The 11:00:20 and 11:00:40 data indicate that the media data was not muted based on the error detection rate. It is not determined, in this embodiment, whether the user was exposed to media data in real time or media data previously recorded at 11:00:20 and 11:00:40, because the portable monitor does not indicate time of detection data at these times. In other embodiments, the stationary monitoring system indicates time of detection data at a rate comparable with the rate at which it gathers other data, and the real time/recorded status is determined at these times. The situation at 11:01:00 is analogous to that of 11:00:00.

At 11:01:20, the user is exposed to CBS rather than ABC, as reported by the stationary monitoring system. The portable monitor first reports data concerning CBS exposure at 11:02:00. Also at this time, the detection error rate increases to 2; as the increase is small and short-lived, however, it is assumed to be do to a brief increase in ambient noise or the like, and is not interpreted as the user muting the audio portion, the user leaving the room, or the predetermined receiver not reproducing the audio portion.

At 11:03:00, the audience measurement data indicates that the audio portion was not received. Since the detection error rate increased to 999, a drastic and sudden increase, and since the increase lasts through 11:03:40 before dropping suddenly back to 1, the processor concludes that the audio portion was muted, as opposed to simply an increase in ambient noise or decrease in volume. Hence, the channel identification data is determined exclusively from the stationary monitoring system. In the illustrated embodiment, the portable monitor is still operative to report data at one-minute intervals, even though it could not resolve the ancillary code. Thus, it reports a time of detection data, and it is determined that the user was still exposed to media data in real time. The audio portion is again reproduced at 11:03:40, as the detection error rate returned to 1.

At 11:03:40, the user is exposed to recorded media data, as can be seen by comparing the actual time to the time code. However, the audience measurement data in the illustrated does not indicate that the media data was recorded until 11:04:00, because the portable monitor only reports time of detection data at one-minute intervals. In other embodiments, the time of detection data is collected by the stationary monitoring system and reported more frequently, allowing for a quicker detection of a change from real-time to recorded media data, and vice-versa.

From 11:05:40 to 11:05:52, there is a clear pattern of increase of the detection error rate. As the increase is steady and over a period of twelve seconds as opposed to a quick spike, the audience measurement data indicates that the user left the vicinity of the receiver.

FIG. 11 depicts a system 800 for monitoring the usage of media data by a user according to certain embodiments. A predetermined receiver 810 receives media data. A stationary monitoring system 830 is coupled with the predetermined receiver 810 through coupling 830, and gathers data concerning the usage of the media data some or all of which 820 is communicated to a processor 870. In the embodiments illustrated by FIG. 11, the stationary monitoring system 830 comprises the processor 870. The predetermined receiver 810 communicates the media data 820, or a portion thereof, to the portable monitor 850 via communications medium 814. The portable monitor, which gathers data concerning usage of the media data is in communication with a base station 855 via communications medium 852. In certain embodiments, the portable monitor 850 is regularly, for example, on a daily basis, coupled with the base station 855 to communicate any data it has gathered. The base station 855 then communicates the data gathered by the portable monitor 850 to the processor 870 in the stationary monitoring system 830. The processor 870 produces audience measurement data based on the data gathered by the stationary monitoring system 830 and the portable monitor 850, and communicates the audience measurement data to a remote location 890 via communications medium 885.

Figure 12:
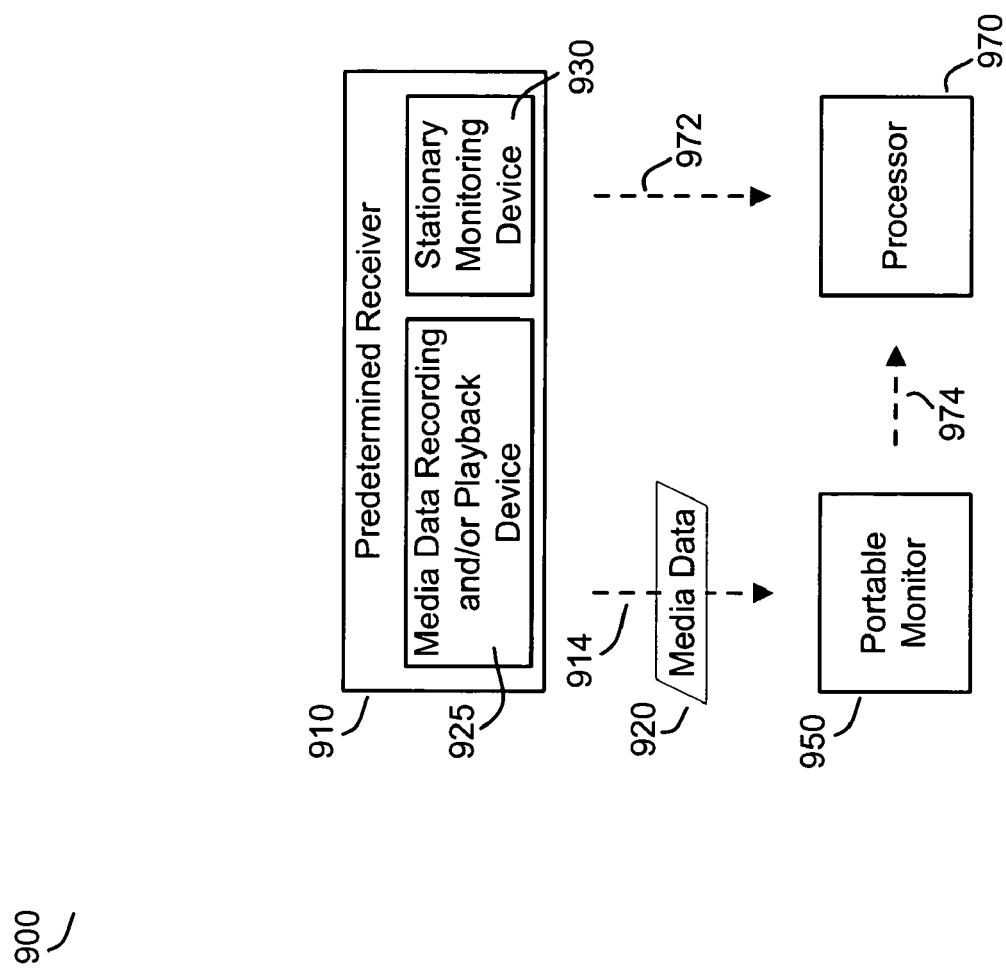
FIG. 12 is a block diagram of certain embodiments of the present invention incorporating a predetermined receiver comprising a stationary monitoring system.

FIG. 12 illustrates a system 900 for gathering data concerning usage of media data by a user. A predetermined receiver 910 comprises a media data and/or playback device 925 and a stationary monitoring system 930. The stationary monitoring system 930 gathers data concerning usage of the media data by the device 925. In certain embodiments, the stationary monitoring system 930 comprises a peripheral of the predetermined receiver 910, or hardware. In other embodiments, the stationary monitoring system 930 comprises software running on a processor included in the predetermined receiver 910. In still other embodiments, the predetermined receiver comprises a personal video recorder, such as a TiVo® device, or the like, which performs the function of both the media data recording and/or playback device 925 and the stationary monitoring system 930. In other embodiments, instead of actually containing a stationary monitoring system, the predetermined receiver is operative to perform the same function that the stationary monitoring system 930 performs in the embodiments illustrated in FIG. 12. In those applications where the receiver is portable or moveable (as in an automobile), the stationary monitoring system is "stationary" with respect to the portable or moveable receiver.

The predetermined receiver 910 is in communication with a portable monitor 950, and communicates at least a portion 920 of the media data to the portable monitor 950 via communications medium 914. The portable monitor 950 also gathers data concerning usage of the media data 920, and then communicates the data to the processor 970 via communications medium 974.

Based on the data gathered by the stationary monitoring system 930 and the portable monitor 950, the processor 970 produces audience measurement data. As with processors in previously illustrated and discussed embodiments, the location of the processor 970 varies between particular embodiments. In certain embodiments, the processor is located adjacent to the predetermined receiver 910, the stationary monitoring system 930, and/or the portable monitor 950, while in other embodiments the processor is located remotely from the predetermined receiver 910, the stationary monitoring system 930, and/or the portable monitor 950.

Figure 13:
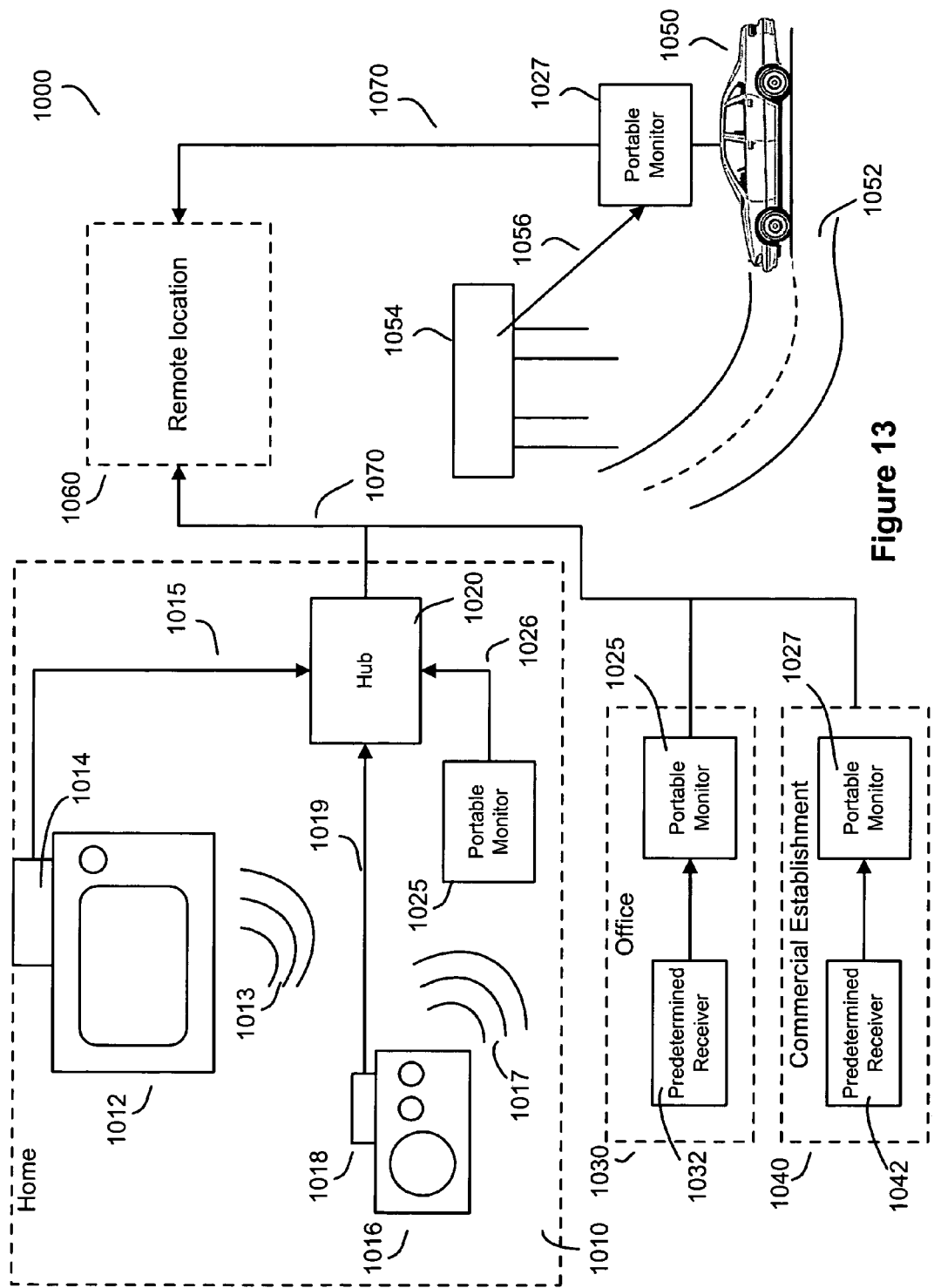
FIG. 13 is an overview of various forms data whose usage may be monitored by certain embodiments of the present invention.

FIG. 13 illustrates a system 1000 showing the types of media data of whose usage is monitored in accordance with certain embodiments of the present invention. The home 1010 contains a television 1012, with associated stationary monitoring system 1014, and a radio 1016, with associated stationary monitoring system 1018. The stationary monitoring system 1014 and the stationary monitoring system 1018 communicate with a hub 1020, via communications medium 1015 and communications medium 1019, respectively, communicating data concerning use of the media data received by the television 1012 and radio 1016, respectively. The portable monitor 1025, associated with a particular user of the television 1012 and radio 1016, gathers data concerning the use of media data from both the television 1012 and radio 1016, and communicates the data to the hub 1020 via communications medium 1026. The hub 1020 is in communication with a remote location 1060, via communications medium 1070. In certain embodiments, the hub 1020 produces audience measurement data based on the data from the stationary monitoring system 1014, stationary monitoring system 1018, and portable monitor 1025, and communicates the audience measurement data to the remote location. In certain other embodiments, the hub 1020 communicates the data from the stationary monitoring system 1014, stationary monitoring system 1018, and portable monitor 1025 to the remote location 1060, and then the audience measurement data is produced at the remote location. In certain embodiments, at least one of communications mediums 1015, 1019, 1026, and 1070 is wired, while in other embodiments, at least one of communications mediums 1015, 1019, 1026, and 1070 is wireless.

FIG. 13 also shows an office 1030, with a predetermined receiver 1032. The user from home 1010 carries portable monitor 1025 to the office 1030, where the portable monitor 1025 gathers data concerning use of media data reproduced or presented by the predetermined receiver 1032, and communicates the data to the remote location 1060 via communications medium 1070.

A car 1050 driving on road 1052 is also illustrated in FIG. 13. A different user, along with portable monitor 1027, is exposed to a billboard 1054. A billboard proximity signal is communicated to portable monitor 1027 via communications medium 1056, and the portable monitor 1027 gathers data concerning exposure to the billboard 1054, and communicates the gathered data to the remote location 1060 via communications medium 1070. Suitable techniques for monitoring exposure to billboards in this manner, as well as further relevant techniques are disclosed in U.S. patent application Ser. No. 10/392,132 in the names of Jack K. Zhang, Jack C. Crystal and James M. Jensen, assigned to the assignee of the present application and hereby incorporated herein by reference in its entirety.

At some point, the driver of car 1050 may visit bar 1040, with predetermined receiver 1042. The portable monitor 1027 gathers data concerning the use of the media data received and reproduced by predetermined receiver 1042, and communicates the gathered data to remote location 1060 via communications medium 1070.

Although FIG. 13 illustrates a single communications medium 1070 for communicating data to the remote location, in other embodiments, plural communications mediums are used. Also, in certain embodiments, stationary monitoring systems, not shown for simplicity and clarity, also monitor the media data from the predetermined receiver 1032 in the office, the predetermined receiver 1042 in the bar, and/or the billboard 1054. However, in other embodiments, a stationary monitoring system is not used at one or more of these locations, at the sacrifice of resolving audience measurement data in a shorter time interval than possible with only portable monitor 1025 or portable monitor 1027. Further, although FIG. 13 shows the monitoring of media data usage of two users, other embodiments monitor the usage of fewer or more users.

FIG. 14 illustrates a system for monitoring usage of media data from a predetermined receiver 1100 that receives media data from a media data provider 1120 to present or reproduce the same for a user. In certain embodiments the media data provider 1120 comprises a cable or satellite television or radio system, an Internet content provider or other source. A portable monitor 1140 is carried on the person of a user of the media data reproduced or presented by the receiver 1100, and operates in the same manner as any one or more of the portable monitors described hereinabove to gather first data concerning usage of the media data. A monitoring system 1160 is coupled with the media data provider 1120 to gather second data concerning usage of the media data by the predetermined receiver 1100. The monitoring system operates in the same manner as any one or more of the stationary monitoring systems described hereinabove to gather second data concerning usage of the media data. In certain embodiments, the monitoring system 1160 is coupled with the head end of a cable or satellite television system from which the predetermined receiver 1100 obtains media data, for example, to gather ancillary codes, such as source identification codes and time codes embedded in media data supplied to subscribers including the user of the predetermined receiver 1100. In certain embodiments, the monitoring system 1160 is coupled with a content server or other source of content providing media data to the predetermined receiver 1100 via the Internet or other network, to gather data such as Internet addresses and meta data.

Although the invention has been described with reference to a particular arrangement of parts, features and the like, these are not intended to exhaust all possible arrangements or features, and indeed many other modifications, combinations, and variations will be ascertainable to those of skill in the art.

What is claimed is:

1. A method for gathering data concerning usage of media data provided from a predetermined receiver to a user, comprising:
    gathering first data concerning usage of the media data by the predetermined receiver by means of a stationary monitoring system, wherein gathering the first data comprises receiving a first ancillary code encoded in the media data;
    gathering second data concerning usage of the media data provided from the predetermined receiver by means of a portable monitor carried on the person of the user, wherein gathering the second data comprises receiving a second ancillary code encoded in the media data;
    gathering first time data corresponding to at least one of (1) a time of reception of the media data in the predetermined receiver and (2) a time of recording of the media data in the predetermined receiver;
    gathering second time data corresponding to a time of reproduction of the media data in the predetermined receiver;
    comparing the first time data with the second time data to determine that one of (1) the time of reception and (2) the time of recording, occurred prior to the time of reproduction; and
    producing audience measurement data concerning usage of the media data provided from the predetermined receiver from the first data and the second data.

2. The method of claim 1, wherein the predetermined receiver comprises the stationary monitoring system.

3. The method of claim 2, wherein the stationary monitoring system comprises software running on a processor of the predetermined receiver.

4. The method of claim 1, wherein the predetermined receiver comprises at least one of a media data recording device, a media data playback device, a user-operated recording device, a user-operated playback device, a television, television broadcast reception equipment, a radio, radio broadcast reception equipment, a video cassette player, a digital video disk player, a digital video recorder, a gaming device, a personal video player, an audio cassette player, a compact disk player, a personal audio player, an electronic book, and a personal computer.

5. The method of claim 1, wherein the media data comprises at least one of television data, radio data, video cassette data, digital video disk data, digital video recorder data, personal video player data, audio cassette data, compact disk data, personal audio player data, audio data, video data, digital audio data, digital video data, gaming data, streaming media, Internet-supplied data, and personal computer data.

6. The method of claim 1, wherein the media data comprises data received by the predetermined receiver from a recording medium.

7. The method of claim 1, wherein the media data comprises data recorded by the predetermined receiver after reception thereof by the predetermined receiver.

8. The method of claim 1, wherein producing audience measurement data comprises producing data reflecting both exposure of the user to media data reproduced upon reception thereof by the predetermined receiver and exposure of the user to media data recorded by the predetermined receiver prior to exposure of the user thereto.

9. The method of claim 1, wherein producing audience measurement data comprises producing data reflecting a proportion of media data recorded by the predetermined receiver to which the user was exposed.

10. The method of claim 1, wherein gathering the second data comprises gathering data corresponding to at least a portion of the first data.

11. The method of claim 10, wherein producing the audience measurement data comprises comparing the first data to the second data.

12. The method of claim 1, wherein gathering the first data comprises gathering first media data reception data comprising an indication of at least one of a station, a channel, and a program received by the predetermined receiver, wherein gathering the second data comprises gathering second media data reception data comprising an indication of at least one of a station, a channel, and a program to which the user was exposed, and wherein producing the audience measurement data comprises comparing the first media data reception data to the second media data reception data.

13. The method of claim 12, wherein gathering the first data comprises gathering a time code from the media data, further comprising comparing the time code with the time of detection data to produce data indicating whether the media data received by the predetermined receiver had been recorded prior to the time at which the first data was gathered.

14. The method of claim 1, further comprising gathering time of detection data corresponding to a time at which the first data was gathered.

15. The method of claim 14, further comprising determining an operational status of the predetermined receiver, based on the time of detection data.

16. The method of claim 15, further comprising using the stationary monitoring system to determine the operational status of the predetermined receiver, and wherein the first data comprises data corresponding to the operational status of the predetermined receiver.

17. The method of claim 15, further comprising communicating at least one of the first data and the time of detection data to a processor, and using the processor to determine the operational status of the predetermined receiver.

18. The method of claim 1, further comprising gathering time of detection data corresponding to a time at which the second data was gathered.

19. The method of claim 18, further comprising determining an operational status of the predetermined receiver, based on the time of detection data.

20. The method of claim 18, wherein gathering the first data comprises gathering a time code from the media data, further comprising comparing the time code with the time of detection data to produce data indicating whether the reproduced media data had been recorded prior to receipt thereof by the portable monitor.

21. The method of claim 1, wherein the predetermined receiver comprises a media data recording device.

22. The method of claim 1, wherein gathering the first data comprises gathering a time code from the media data.

23. The method of claim 22, further comprising determining an operational status of the predetermined receiver, based on the time code.

24. The method of claim 23, further comprising using the stationary monitoring system to determine the operational status of the predetermined receiver, and wherein the first data comprises data corresponding to the operational status of the predetermined receiver.

25. The method of claim 23, further comprising using the portable monitor to determine the operational status of the predetermined receiver, and wherein the second data comprises data corresponding to the operational status of the predetermined receiver.

26. The method of claim 23, further comprising communicating at least one of the first data and the second data to a processor, and using the processor to determine the operational status of the predetermined receiver.

27. The method of claim 1, wherein the first data is resolved within a first time interval, wherein the second data is resolved within a second time interval, and wherein the first time interval is shorter than the second time interval.

28. The method of claim 27, wherein the first data and the second data comprise an indication of at least one of a station, a channel, a commercial, a segment and a program to which the user is exposed.

29. The method of claim 28, wherein gathering the first data comprises detecting the first ancillary code in audio media received by the predetermined receiver by means of the stationary monitoring system.

30. The method of claim 27, wherein gathering the second data comprises detecting the second ancillary code in audio media data received as acoustic energy by the portable monitor.

31. The method of claim 27, further comprising comparing the first data and the second data to detect correspondence there between and based on a detected correspondence thereof, producing third data representing the usage of media data as reflected by the second data and resolved within a third time interval shorter than the second time interval.

32. The method of claim 1, further comprising gathering user identification data associated with the user, wherein the user identification data uniquely identifies the user.

33. The method of claim 32, further comprising associating the audience measurement data with the user identification data, thereby producing user-specific audience measurement data.

34. The method of claim 1, wherein gathering the first data further comprises: receiving an audio portion of the media data in the stationary monitoring system; and detecting the first ancillary code in the audio portion.

35. The method of claim 34, wherein receiving the audio portion of the media data in the stationary monitoring system comprises receiving the audio portion though an audio input device coupling the stationary monitoring system to the predetermined receiver.

36. The method of claim 1, wherein gathering the second data further comprises: receiving an audio portion of the media data in the portable monitor; and detecting the second ancillary code in the audio portion.

37. The method of claim 36, wherein receiving the audio portion of the media data in the portable monitor comprises receiving the audio portion by means of a microphone or other transducer.

38. The method of claim 1, wherein the first and second ancillary codes comprise the same code.

39. The method of claim 1, where in the first and second ancillary codes comprise different codes.

40. The method of claim 39, wherein gathering the first ancillary code comprises gathering the first ancillary code from one of a video portion of the media data and a data packet of digital media data, and wherein gathering the second ancillary code comprises gathering the second ancillary code from audio media data.

41. The method of claim 1, wherein gathering the first data comprises receiving a data packet broadcast within a digital broadcast channel, wherein the data packet comprises an indication of at least one of a station, a channel, and a program received by the predetermined receiver.

42. The method of claim 1, wherein gathering the second data comprises detecting an ancillary code encoded in an audio portion of the media data received in the portable monitor through a microphone or other transducer.

43. The method of claim 1, further comprising: communicating the first data and the second data to a processor; and producing data by means of the processor indicating that an audio portion of the media data received by the predetermined receiver has not been reproduced, based on the first data and the second data.

44. The method of claim 43, wherein the processor produces the data based on the absence in the second data of an indication of at least one of a station, a channel, and a program to which the user was exposed.

45. The method of claim 42, further comprising: communicating the first data and the second data to a processor; and producing data by means of the processor indicating that the user left a vicinity of the predetermined receiver, based on the first data and the second data.

46. The method of claim 45, wherein the second data comprises detection error data produced by the portable monitor.

47. The method of claim 1, further comprising:
communicating the first data from the stationary monitoring system to a processor;
communicating the second data from the portable monitor to the processor; and
using the processor to produce the audience measurement data concerning usage of the media data received by the predetermined receiver and reproduced for the user, based on the first data and the second data.

48. The method of claim 1, further comprising communicating the audience measurement data to a remote location.

49. The method of claim 1, further comprising communicating the first data and the second data to a remote location, and wherein producing audience measurement data comprises producing the audience measurement data at the remote location.

50. The method of claim 1, comprising communicating the first data and the second data to a processor, wherein the processor produces the audience measurement data from the first data and the second data.

51. The method of claim 50, wherein the processor compares the first data and the second data to produce the audience measurement data.

52. The method of claim 51, wherein the processor produces match data by comparing the first data to the second data and produces the audience measurement data based on the match data.

53. The method of claim 51, wherein the first data and the second data are based on ancillary codes associated with the media data.

54. The method of claim 51, wherein the first data and the second data comprise signatures extracted from the media data.

55. The method of claim 50, wherein the second data comprises user identification data and the processor associates the user identification data with the audience measurement data.

56. The method of claim 55, wherein the user identification data uniquely identifies the portable monitor.

57. The method of claim 50, wherein the monitoring system comprises the processor.

58. The method of claim 50, wherein the portable monitor comprises the processor.

59. The method of claim 1, wherein the second data comprises user identification data.

60. The method of claim 59, wherein the first data and the second data comprise time data and/or time code data.

61. The method of claim 59, wherein the user identification data uniquely identifies the user.

62. A system for gathering data concerning usage of media data provided from a predetermined receiver to a user, comprising:
- a stationary monitoring system coupled with the predetermined receiver for gathering first data concerning usage of the media data by the predetermined receiver, wherein the media data comprises a first ancillary code and a second ancillary code encoded in the media data;
- a portable monitor carried on the person of the user having an input to receive the media data provided from the predetermined receiver, for gathering second data concerning usage of the media data provided from the predetermined receiver; and
- a processor having at least one input to receive the first data from the stationary monitoring system and the second data from the portable monitor, for producing audience measurement data concerning usage of the media data provided from the predetermined receiver from the first data and the second data,
- wherein the stationary monitoring system is operative to gather first time data corresponding to at least one of (1) a time of reception of the media data by the predetermined receiver and (2) a time of recording in the predetermined receiver, wherein the portable monitor is operative to gather second time data corresponding to a time of reproduction of the media data recorded by the predetermined receiver, and wherein the processor is operative to compare the first time data and the second time data to produce data indicating that the media data was recorded at a time prior to reproduction of the media data.

63. The system of claim 62, wherein the predetermined receiver comprises the stationary monitoring system.

64. The system of claim 63, wherein the stationary monitoring system comprises software running on a processor of the predetermined receiver.

65. The system of claim 62, wherein the predetermined receiver comprises at least one of a media data recording device, a media data playback device, a user-operated recording device, a user-operated playback device, a television, television broadcast reception equipment, a radio, radio broadcast reception equipment, a video cassette player, a digital video disk player, a digital video recorder, a gaming device, a personal video player, an audio cassette player, a compact disk player, a personal audio player, an electronic book, and a personal computer.

66. The system of claim 62, wherein the media data comprises at least one of television data, radio data, video cassette data, digital video disk data, digital video recorder data, personal video player data, audio cassette data, compact disk data, personal audio player data, audio data, video data, digital audio data, digital video data, gaming data, streaming media, Internet-supplied data, and personal computer data.

67. The system of claim 62, wherein the media data comprises data received by the predetermined receiver from a recording medium.

68. The method of claim 62, wherein the media data comprises data recorded by the predetermined receiver after reception thereof by the predetermined receiver.

69. The system of claim 62, wherein the audience measurement data comprises data reflecting both exposure of the user to media data reproduced upon reception thereof by the predetermined receiver and exposure of the user to media data recorded by the predetermined receiver prior to exposure of the user thereto.

70. The system of claim 62, wherein the audience measurement data comprises data reflecting a proportion of media data recorded by the predetermined receiver to which the user was exposed.

71. The system of claim 62, wherein the second data corresponds to at least a portion of the first data.

72. The system of claim 71, wherein the processor is operative to compare the first data to the second data.

73. The system of claim 72, wherein the stationary monitoring system is operative to determine an operational status of the predetermined receiver based on the time code, and wherein the first data comprises data corresponding to the operational status of the predetermined receiver.

74. The system of claim 62, wherein the first data comprises first media data reception data comprising an indication of at least one of a station, a channel, and a program received by the predetermined receiver, wherein the second data comprises second media data reception data comprising an indication of at least one of a station, a channel, and a program to which the user was exposed, and wherein the processor is operative to compare the first media data reception data to the second media data reception data.

75. The system of claim 62, further comprising a clock coupled to the stationary monitoring system for gathering time of detection data corresponding to a time at which the first data was gathered.

76. The system of claim 75, wherein the processor is operative to determine an operational status of the predetermined receiver, based on the time of detection data.

77. The system of claim 75, wherein the stationary monitoring system is operative to determine an operational status of the predetermined receiver, based on the time of detection data.

78. The system of claim 75, wherein the first data comprises a time code, and wherein the processor is operative to compare the time code with the time of detection data to produce data indicating whether the reproduced media data had been recorded prior to the time at which the first data was gathered.

79. The system of claim 62, further comprising a clock coupled to the portable monitor for gathering time of detection data corresponding to a time at which the second data was gathered.

80. The system of claim 79, wherein at least one of the portable monitor and the processor is operative to determine an operational status of the predetermined receiver, based on the time of detection data.

81. The system of claim 79, wherein the first data comprises a time code, and wherein at least one of the portable monitor and the processor is operative to compare the time code with the time of detection data to produce data indicating whether the reproduced media data had been recorded prior to receipt thereof by the portable monitor.

82. The system of claim 62, wherein the predetermined receiver comprises a media data recording device.

83. The system of claim 62, wherein the first data comprises a time code gathered from the media data.

84. The system of claim 83, wherein the processor is operative to determine an operational status of the predetermined receiver, based on the time code.

85. The system of claim 62, wherein the portable monitor is operative to detect a time code in the media data, and wherein one of the portable monitor and the processor is operative to determine an operational status of the predetermined receiver.

86. The system of claim 62, wherein the stationary monitoring system is operative to resolve the first data within a first time interval, wherein the portable monitor is operative to resolve the second data within a second time interval, and wherein the first time interval is shorter than the second time interval.

87. The system of claim 86, further comprising an ancillary code encoded in audio media data, wherein the portable monitor is operative to receive the audio media data as acoustic energy, and gather the second data based on the ancillary code.

88. The system of claim 87, further comprising an ancillary code encoded in audio media data received by the predetermined receiver, wherein the stationary monitoring system is operative to receive the audio media data, and gather the first data based on the ancillary code.

89. The system of claim 86, wherein at least one of the stationary monitoring system and the processor is operative to compare the first data and the second data to detect correspondence there between, and based on a detected correspondence thereof, produce third data representing the usage of media data as reflected by the second data and resolved within a third time interval shorter than the second time interval.

90. The system of claim 86, wherein the first data and the second data comprise an indication of at least one of a station, a channel, and a program to which the user is exposed.

91. The system of claim 62, wherein the processor is operative to gather user identification data uniquely identifying the user.

92. The system of claim 91, wherein the processor is operative to associate the audience measurement data with the user identification data, thereby producing user-specific audience measurement data.

93. The system of claim 62, wherein the stationary monitoring system is operative to detect the first ancillary code and the portable monitoring device is operative to detect the second ancillary code.

94. The system of claim 93, wherein the stationary monitoring system comprises:
an audio receiver for receiving an audio portion of the media data; and
a detector coupled to the audio receiver for detecting the first ancillary code in the audio portion of the media data.

95. The system of claim 94, wherein the audio receiver is physically coupled to the predetermined receiver.

96. The system of claim 93, wherein the portable monitor comprises: an audio receiver for receiving an audio portion of the media data; and a detector coupled to the audio receiver for detecting the second ancillary code in the audio portion of the media data.

97. The system of claim 96, wherein the audio receiver comprises a microphone or other transducer.

98. The system of claim 93, wherein the first and second ancillary codes comprise the same code.

99. The system of claim 93, wherein the first and second ancillary codes comprise different codes.

100. The system of claim 99, wherein the first ancillary code is encoded in one of a video portion of the media data and a data packet of digital media data, and the second ancillary code is encoded in audio media data.

101. The system of claim 62, wherein the stationary monitoring system is operative to gather the first data from a data packet broadcast in a digital broadcast channel received by the predetermined receiver, wherein the first data comprises an indication of at least one of a station, a channel, and a program received by the predetermined receiver.

102. The system of claim 62, wherein the media data comprises an ancillary code encoded in an audio portion of the media data, and the portable monitor comprises a microphone or other transducer for receiving the audio portion.

103. The system of claim 102, wherein the processor is operative to produce an indication that the audio portion of the media data received by the predetermined receiver has not been reproduced, based on the first data and the second data.

104. The system of claim 103, wherein the processor is operative to produce the indication based on the absence in the second data of an indication of at least one of a station, a channel, and a program to which the user was exposed.

105. The system of claim 102, wherein the processor is operative to produce an indication that the user left a vicinity of the predetermined receiver, based on the first data and the second data.

106. The system of claim 105, wherein the second data comprises detection error data produced by the portable monitor.

107. The system of claim 62, wherein the processor is operative to communicate the audience measurement data to a remote location.

108. The system of claim 62, wherein the processor is located remotely from the stationary monitoring system and the portable monitoring device.

109. The system of claim 62, wherein the monitoring system comprises the processor.

110. The system of claim 62, wherein the portable monitoring comprises the processor.

111. The system of claim 62, wherein the monitoring system comprises a stationary monitoring system.

* * * * *